United States Patent
Englert et al.

(10) Patent No.: US 9,896,807 B2
(45) Date of Patent: Feb. 20, 2018

(54) ACOUSTICAL CEILING TILE

(71) Applicant: USG INTERIORS, LLC, Chicago, IL (US)

(72) Inventors: Mark H. Englert, Libertyville, IL (US); William A. Frank, Lake Villa, IL (US)

(73) Assignee: USG INTERIORS, LLC, Chicago, IL (US)

( * ) Notice: Subject to any disclaimer, the term of this patent is extended or adjusted under 35 U.S.C. 154(b) by 42 days.

(21) Appl. No.: 14/866,055

(22) Filed: Sep. 25, 2015

(65) Prior Publication Data

US 2017/0089014 A1    Mar. 30, 2017

(51) Int. Cl.
| | | |
|---|---|---|
| *D21J 1/20* | (2006.01) | |
| *D21J 1/16* | (2006.01) | |
| *D21H 13/40* | (2006.01) | |
| *D21H 13/44* | (2006.01) | |
| *D21H 17/28* | (2006.01) | |
| *D21H 17/68* | (2006.01) | |
| *E04B 1/86* | (2006.01) | |
| *C04B 14/46* | (2006.01) | |
| *D21H 23/04* | (2006.01) | |
| *C04B 26/28* | (2006.01) | |
| *E04B 1/84* | (2006.01) | |
| *C04B 111/10* | (2006.01) | |
| *C04B 111/52* | (2006.01) | |

(52) U.S. Cl.
CPC ............. *D21J 1/20* (2013.01); *C04B 26/285* (2013.01); *D21H 13/40* (2013.01); *D21H 13/44* (2013.01); *D21H 17/28* (2013.01); *D21H 17/68* (2013.01); *D21H 23/04* (2013.01); *D21J 1/16* (2013.01); *E04B 1/86* (2013.01); *C04B 2111/10* (2013.01); *C04B 2111/52* (2013.01); *E04B 2001/8461* (2013.01); *E04B 2001/8476* (2013.01)

(58) Field of Classification Search
CPC ........ D21J 1/20; D21J 1/00; D21J 1/06; D21J 7/00; D21J 1/16; D21H 13/40; D21H 17/28; D21H 17/68; D21H 17/63; D21H 23/04; D21H 13/44; E04B 1/86; E04B 2001/8476; E04B 2001/8461; E04B 1/84; D21F 1/10; D21F 1/66; C04B 14/185; C04B 26/285; C04B 18/241; C04B 14/38; C04B 14/46; Y10S 106/02; B29C 47/0019; Y10T 428/249925; Y10T 442/53; B29L 2031/104; D04H 1/4209; D04H 1/587

See application file for complete search history.

(56) References Cited

U.S. PATENT DOCUMENTS

| | | | |
|---|---|---|---|
| 3,244,632 A | | 4/1966 | Schulz et al. |
| 3,952,830 A | * | 4/1976 | Oshida .................. C04B 28/001 181/294 |
| 4,911,788 A | * | 3/1990 | Pittman .................. B28B 1/526 162/145 |
| 5,071,511 A | * | 12/1991 | Pittman ................. C04B 26/285 162/145 |
| 5,277,762 A | | 1/1994 | Felegi, Jr. et al. |
| 5,558,710 A | * | 9/1996 | Baig ..................... C04B 18/021 106/122 |
| 5,911,818 A | * | 6/1999 | Baig ..................... C04B 14/185 106/122 |
| 5,964,934 A | * | 10/1999 | Englert ................. C04B 14/185 106/287.1 |
| 6,616,804 B2 | | 9/2003 | Foster et al. |
| 6,855,753 B1 | | 2/2005 | Englert |
| 6,919,132 B2 | | 7/2005 | Felegi, Jr. et al. |
| 7,056,582 B2 | | 6/2006 | Carbo et al. |
| 7,410,688 B2 | * | 8/2008 | Baig ........................ B32B 3/26 428/292.4 |
| 7,862,687 B2 | * | 1/2011 | Englert .................. D21H 11/20 162/152 |
| 7,879,433 B1 | | 2/2011 | Felegi, Jr. et al. |
| 8,057,915 B2 | * | 11/2011 | Song .................. B28B 19/0092 106/698 |
| 8,080,133 B2 | | 12/2011 | Cao et al. |
| 8,133,354 B2 | | 3/2012 | Baig |
| 8,133,357 B2 | | 3/2012 | Cao et al. |
| 8,383,233 B2 | * | 2/2013 | Palm ........................ E04B 9/04 106/673 |
| 9,492,961 B2 | * | 11/2016 | Xu ........................ D04H 1/4209 |
| 2009/0011251 A1 | * | 1/2009 | Englert ................. C04B 14/185 428/446 |
| 2009/0126886 A1 | * | 5/2009 | Englert .................. D21H 11/20 162/151 |

(Continued)

FOREIGN PATENT DOCUMENTS

| | | | | |
|---|---|---|---|---|
| EP | 0663374 A1 | * | 7/1995 | ............. C04B 14/38 |
| WO | WO 9908977 A1 | * | 2/1999 | ........... C04B 14/185 |
| WO | 2012087611 A1 | | 6/2012 | |

OTHER PUBLICATIONS

Standard Test Methods for Strength Properties of Prefabricated Architectural Acoustical Tile or Lay-In Ceiling Panels1; Designation: C 367-99, ASTM, Published Nov. 1999.

*Primary Examiner* — Jose Fortuna
(74) *Attorney, Agent, or Firm* — Vorys, Sater, Seymour and Pease LLP; Brian M. Wishnow; Philip T. Petti

(57) ABSTRACT

An acoustical tile including: 8 to 25 wt % mineral wool, 9 to 15 wt % starch binder, 9 to 15 wt % cellulosic fiber, wherein preferably the cellulosic fiber is newsprint, and 40 to 65 wt % perlite, wherein the weight ratio of the starch to the cellulosic fiber is 0.6 to 1.3:1; and a process for making the acoustical tile.

19 Claims, 13 Drawing Sheets

(56) References Cited

U.S. PATENT DOCUMENTS

| | | | |
|---|---|---|---|
| 2009/0173464 A1* | 7/2009 | Baig | D21H 17/28 |
| | | | 162/164.1 |
| 2011/0232854 A1* | 9/2011 | Englert | D21J 1/08 |
| | | | 162/129 |
| 2011/0247894 A1* | 10/2011 | Englert | C04B 26/285 |
| | | | 181/294 |
| 2013/0206501 A1* | 8/2013 | Yu | E04B 9/045 |
| | | | 181/290 |
| 2014/0034866 A9* | 2/2014 | Albarran | E04B 9/001 |
| | | | 252/62 |
| 2016/0032583 A1* | 2/2016 | Xu | D04H 1/4209 |
| | | | 181/294 |
| 2016/0230013 A1* | 8/2016 | Englert | C09D 1/00 |
| 2017/0089014 A1* | 3/2017 | Englert | D21J 1/20 |

\* cited by examiner

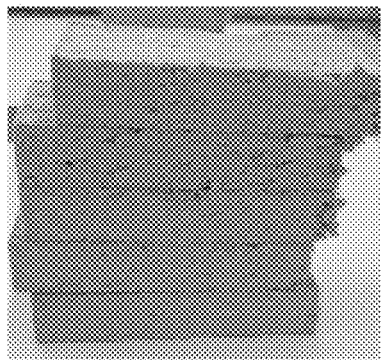
FIG. 3.1
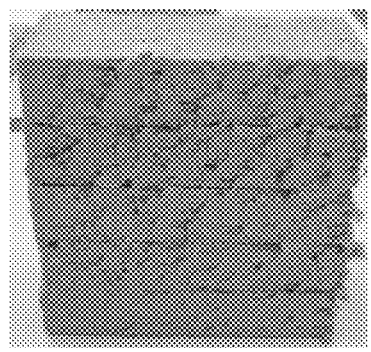
FIG. 3.2
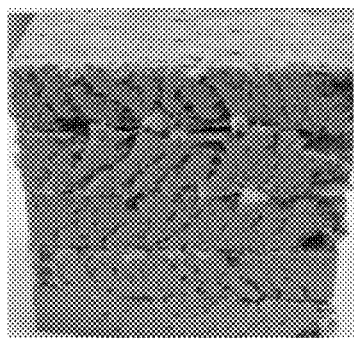
FIG. 3.3
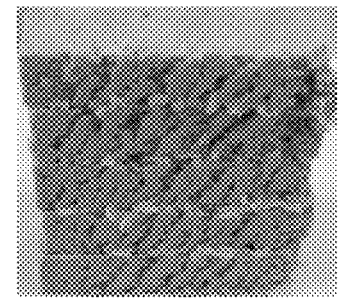
FIG. 3.4
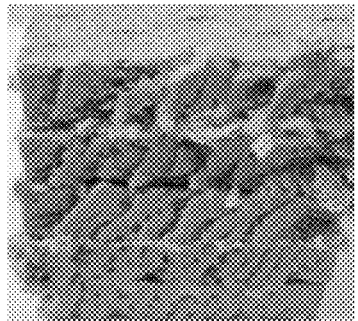
FIG. 3.5

70°F/50%RH Board 1 Newsprint: 19.5%;
Starch: 7.5%

90°F/90%RH Board 1
Newsprint: 19.5%; Starch: 7.5%

70°F/50%RH Board 6
Newsprint: 10.0%; Starch: 10.0%

90°F/90%RH Board 6
Newsprint: 10.0%; Starch: 10.0%

70°F/50%RH Board 10
Newsprint: 10.0%; Starch: 12.5%

90°F/90%RH Board 10
Newsprint: 10.0%; Starch: 12.5%

70°F/50%RH Control Board
Newsprint: 20.0%; Starch: 8.0%

90°F/90%RH Control Board
Newsprint: 20.0%; Starch: 8.0%

70°F/50%RH Trial Board 1
Newsprint: 15.0%; Starch: 9.0%

90°F/90%RH Trial Board 1
Newsprint: 15.0%; Starch: 9.0%

70°F/50%RH Trial Board 2
Newsprint: 12.0%; Starch: 10.0%

90°F/90%RH Trial Board 2
Newsprint: 12.0%; Starch: 10.0%

FIG. 25

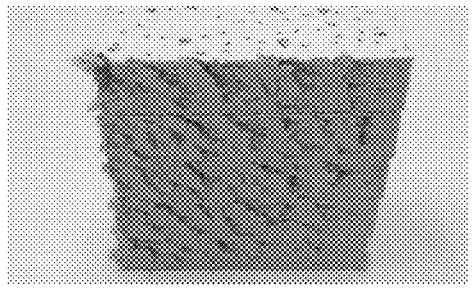

70°F/50%RH Cutability Photograph on
First Production Line Control Board
20.0% Newsprint / 8.0% Starch

FIG. 27

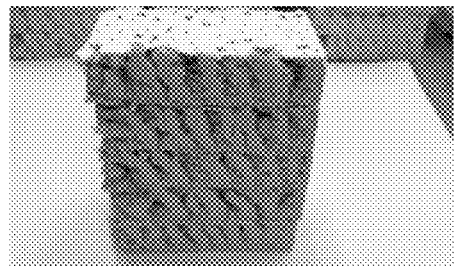

90°F/90%RH Cutability Photograph on
First Production Line Control Board
20.0% Newsprint / 8.0% Starch

FIG. 26

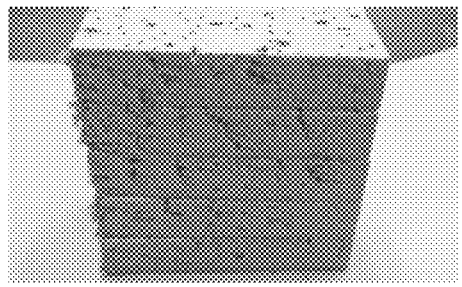

70°F/50%RH Cutability Photograph on
First Production Line Trial 1 Board
12.0% Newsprint / 10.0% Starch

FIG. 28

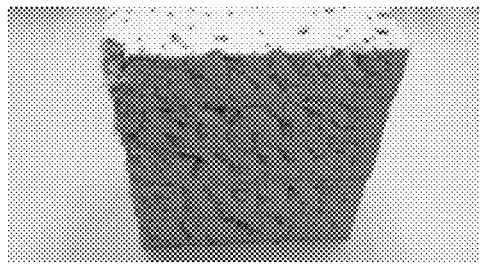

90°F/90%RH Cutability Photograph on
First Production Line Trial 1 Board
12.0% Newsprint / 10.0% Starch

FIG. 29

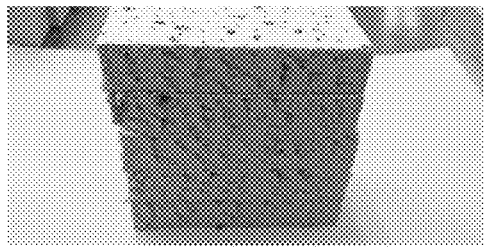

70°F/50%RH Second Production Line
Control Board
20.0% Newsprint/8.0% Starch

FIG. 32

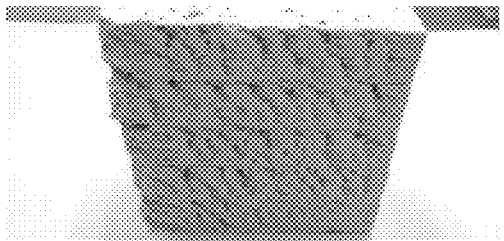

90°F/90%RH Second Production Line
Control Board
20.0% Newsprint/8.0% Starch

FIG. 30

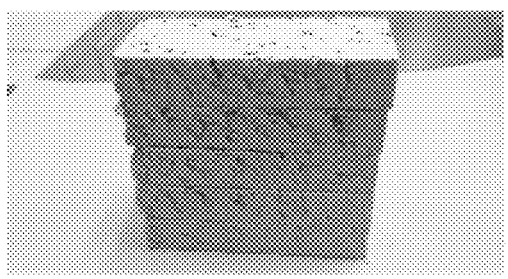

70°F/50%RH Second Production Line
Trial 1 Board
15.0% Newsprint/9.0% Starch

FIG. 33

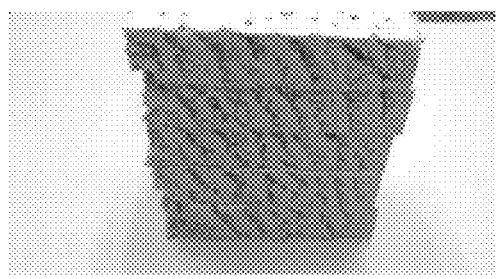

90°F/90%RH Second Production Line
Trial 1 Board
15.0% Newsprint/9.0% Starch

FIG. 31

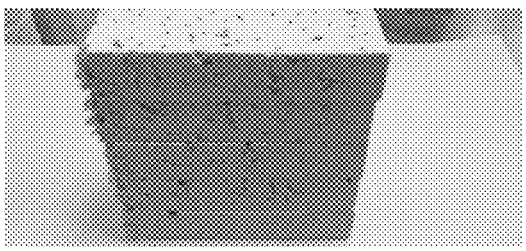

70°F/50%RH Second Production Line
Trial 2 Board
12.0% Newsprint/10.0% Starch

FIG. 34

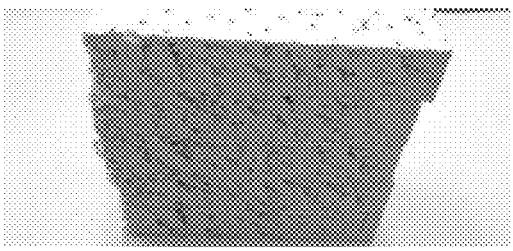

90°F/90%RH Second Production Line
Trial 2 Board
12.0% Newsprint/10.0% Starch

ACOUSTICAL CEILING TILE

FIELD OF THE INVENTION

The invention relates to materials for building construction and, in particular, to ceiling panel compositions comprising cellulosic fiber such as newsprint (also known as "news") and binders such as starch in specific weight proportion to prepare ceiling tiles with harder cores which produce a smoother cut requiring less cutting force than prior art ceiling tiles.

BACKGROUND OF THE INVENTION

The water felting of dilute aqueous dispersions of mineral wool and lightweight aggregate is a well-known commercial process for manufacturing acoustical ceiling tiles. In this process, an aqueous slurry of component materials such as mineral wool, perlite, binder such as starch or latex, inorganic material and cellulosic fiber is deposited onto a moving foraminous support wire, such as a Fourdrinier or Oliver mat forming machine, for dewatering or drainage. The slurry may first be drained by gravity followed by vacuum suction to form a base mat. The wet base mat is then pressed to the desired thickness between rolls to remove additional water. The pressed base mat is then dried in ovens before the dried material is cut to the desired dimensions. The surfaces of the cut material can be sanded and coated on the top and or bottom to produce ceiling tiles and panels.

Ceiling tile used in suspended ceilings should have certain performance characteristics that include sound absorbing capacity, relatively low density, flame spread and optionally fire-resistance, and sag-resistance. Besides meeting these criteria, the raw materials need to be relatively inexpensive to procure and easy to process. These characteristics can be difficult to achieve even with a composite material. Moreover, the universe of available recycled materials that can contribute one or more of these desirable characteristics, that is compatible with other viable materials, that is available at a practical cost and that does not introduce undesirable characteristics is limited. It is important to find a formulation that achieves these essential characteristics, but also is compatible with existing manufacturing equipment and processes.

Mineral wool acoustical tiles are very porous which results in good sound absorption. U.S. Pat. Nos. 3,498,404; 5,013,405; 5,047,120 and 5,558,710 disclose mineral fillers may be incorporated into the composition to improve sound absorbing properties and to provide lightweight acoustical tiles and panels.

The acoustical tile compositions include a lightweight aggregate, typically expanded perlite. While the use of expanded perlite can require a high level of water to form a workable slurry, the use of high density perlite can alleviate this problem. U.S. Pat. No. 8,393,233 to Palm et al discloses employing expanded glass beads rather than perlite. Inorganic materials, such as clay may be used in ceiling tiles to impart fire resistance (as defined by ASTM Test Method E119) because the clay sinters during the fire endurance test. Various commercial clays such as kaolin, and bentonite, etc. can be used in ceiling tile fabrication. Gypsum is a useful inorganic material because it also acts as a flocculent. Calcium carbonate is another useful inorganic material because it is inexpensive and can add hardness to the finished product.

Mineral wool-based acoustical ceiling tile compositions must contain a binder. Starch is usually used as the binder in mineral wool-based ceiling tiles. U.S. Pat. Nos. 5,911,818 and 5,964,934 suggest as much as 15% by weight of the composition may be starch although about 6 or 7% by weight is conventionally used.

U.S. Pat. No. 6,855,753 to Englert discloses an acoustical tile composition in which the conventional starch binder is replaced by a wet-strength resin, such as a polyamine epichlorohydrin resin. This can be fabricated into ceiling tiles and panels using conventional water felting processes and equipment. The compositions, with the polyamine epichlorohydrin resins binder, can be dried significantly faster than comparable compositions containing conventional starch binders.

U.S. Pat. No. 7,056,582 to Carbo et al discloses a composition for a slurry for manufacture of acoustical panels includes one or more fillers, one or more binders, water and zinc pyrithione. At least one of the fillers and/or binders includes microbial nutrients in an amount of at least 1% based on the dry weight of the acoustical panel. In another embodiment of the invention, acoustical panels include a core having a plurality of opposing surfaces and being at least ⅛ inches thick. The core comprises the dried product of a slurry of fillers, binders and water. Zinc pyrithione is present in at least one of the core and a coating applied to at least one of the surfaces of the core.

U.S. Pat. No. 8,057,915 to Song et al discloses an acoustical product including a matrix of calcium sulfate dihydrate crystals and expanded perlite distributed throughout the matrix. The expanded perlite has a particle size distribution with at least 10% of the perlite having a particle diameter of 700 microns or more, and the amount of expanded perlite to calcium sulfate dihydrate is about 35% to about 75% by weight, based upon the dry weight of the calcium sulfate dihydrate. A dispersing agent and glass fibers having a particle length of about ¼ inch to about 1 inch are dispersed throughout the gypsum matrix.

U.S. Pat. No. 8,133,354 to Baig discloses a composition and process suitable for making acoustical tiles. Certain embodiments of the composition comprise: perlite; an inorganic material selected from the group consisting of calcium sulfate, calcium carbonate, clay and mixtures thereof; a binder selected from the group consisting of starch, a combination of starch and cellulosic fibers, latex, kraft paper gel and mixtures thereof; optionally mineral wool; optionally gypsum; and cellulosic fiber, wherein at least a portion of the cellulosic fiber and at least a portion of the inorganic material are pulp and paper processing waste comprising cellulosic fiber, clay and calcium carbonate. Certain embodiments of the process comprise: forming an aqueous slurry; continuously flowing slurry onto a moving foraminous wire to form a cake; dewatering the cake to form a base mat; and drying the base mat.

U.S. Pat. No. 8,383,233 to Palm et al discloses a water felted base mat for a suspended ceiling tile comprising on a weight basis about ½ mineral wool, starch binder, limited to about ⅛, newsprint, limited to about ⅛, and about ¼ expanded glass beads.

The cellulosic fiber for ceiling tiles in compositions and methods of the present invention is obtained from newsprint being recycled. Typically, either hammer-milled and/or hydropulped newsprint being recycled is employed as the cellulosic fibers.

SUMMARY OF THE INVENTION

The invention involves the discovery of a successful weight ratio of starch binder and cellulosic fiber in the form of newsprint, for wet felted ceiling tile which produces a harder core than conventional wet felted ceiling tiles for ease of cutting under humid conditions with less cutting force and improved final cut tile appearance compared to conventional fiberboard based wet felted mat tile.

The formulation is suitable for use in existing water felted processes and offers the potential of increasing the energy and material usage efficiency of such processes. It has been discovered tiles can be prepared with lower cellulosic fiber, such as newsprint, and higher starch binder content than tiles made with conventional formulations used in a wet felted formulation. The filler material, such as mineral wool and expanded perlite used with selected components in appropriate proportions, achieves satisfactory sound absorption and suitable mechanical properties including wet and dry strength, hardness, stiffness, and sag resistance. These characteristics, moreover, can be achieved in a base mat having relatively low density of about 10 to 17 lbs./cubic ft., most preferably about 10 to 13 lbs./cubic ft.

The invention provides an acoustical tile comprising:
- 8.0 to 25.0 wt %, preferably 8.0 to 20.0 wt %, more preferably 15.0 to 20.0 wt % mineral wool,
- 9.0 to 15.0 wt %, preferably 9.5 to 13.0 wt %, more preferably 9.5 to 10.5 wt % starch binder,
- 9.0 to 15.0 wt %, preferably 10.0 to 14.5 wt %, more preferably 12.0 to 14.0 wt % cellulosic fiber, preferably the cellulosic fiber is newsprint, and
- 40 to 65 wt %, preferably 45.0 to 65.0 wt %, more preferably 55.0 to 65.0 wt % perlite;
- wherein the weight ratio of the starch to the cellulosic fiber is 0.6 to 1.3:1.0, preferably 0.7 to 1.0:1.0, more preferably 0.7 to 0.9:1.0, most preferably 0.7 to 0.8:1.0.

The invention provides a process for manufacturing the acoustical tile in a water-felting process, the process comprising:

mixing an aqueous slurry comprising water and, ingredients comprising on a water free-basis:
- 8.0 to 25.0 wt %, preferably 8.0 to 20.0 wt %, more preferably 15.0 to 20.0 wt % mineral wool,
- 9.0 to 15.0 wt %, preferably 9.5 to 13.0 wt %, more preferably 9.5 to 10.5 wt % starch binder,
- 9.0 to 15.0 wt %, preferably 10.0 to 14.5 wt %, more preferably 12.0 to 14.0 wt % cellulosic fiber, preferably the cellulosic fiber of any of these three ranges is newsprint, and
- 40.0 to 65.0 wt %, preferably 45.0 to 65.0 wt %, more preferably 55.0 to 65.0 wt % perlite;
- wherein the weight ratio of the starch to the cellulosic fiber is 0.6 to 1.3:1.0, preferably 0.7 to 1.0:1.0, more preferably 0.7 to 0.9:1.0, most preferably 0.7 to 0.8:1.0;

continuously flowing the slurry onto a moving foraminous support wire to form a cake;
dewatering the cake to form a base mat; and
drying the base mat to produce the acoustical tile.

In the process, the aqueous slurry of the composition is flowed onto a moving foraminous support wire where it forms the cake which is dewatered, first by gravity and then by vacuum. The dewatered cake is then pressed to a selected thickness to form the base mat. The pressing step further dewaters the base mat. The base mat is then passed into a drying kiln in which the moisture in the base mat is reduced to less than 5 wt. % and preferably less than 1 wt. %.

The acoustical tile of the invention, as well as the acoustical tile and the slurry of the process for making the acoustical tile of the invention, preferably is about 4/8 inches to about 1 inch thick, more preferably about 5/8 inches to about 7/8 inches thick.

The acoustical tile of the invention, as well as the acoustical tile and the slurry of the process for making the acoustical tile of the invention, preferably have an absence of any one or more of the following ingredients glass beads, clay, vermiculite, gypsum, calcium carbonate, magnesium carbonate, and zinc pyrithione. Most preferably the acoustical tile of the invention, and the acoustical tile and the slurry of the process for making the acoustical tile of the invention, have an absence of all the following ingredients glass beads, clay, vermiculite, gypsum, calcium carbonate, magnesium carbonate, and zinc pyrithione.

The acoustical tile of the invention and the acoustical tile and the slurry in the process for making the acoustical tile of the invention on a water free basis preferably has an absence of inorganic material other than perlite and mineral wool. This exclusion is on a water free basis. Thus, this exclusion does not exclude water.

U.S. Pat. No. 8,133,354 to Baig employs pulp and paper processing waste comprising cellulosic fiber, clay and calcium carbonate of in its cellulosic fiber. In contrast, the acoustical tile of the invention, and the acoustical tile and the slurry in the process for making the acoustical tile of the invention, preferably has 0% of the cellulosic fiber provided by paper sludge obtained from pulp and paper processing waste.

For purposes of the present specification Newsprint (also known as "News") is defined as a dilute (preferably 1 to 5%, typically about 2.5%, weight percent solids) mixture of newsprint fibers mixed with water which has been hydropulped to achieve individual fibers and fiber bundles.

For purposes of the present application all percents are weight percent unless otherwise indicated.

BRIEF DESCRIPTION OF THE FIGURES

FIG. 3.1 shows a sample having a cutability rating of "1".
FIG. 3.2 shows a sample having a cutability rating of "2".
FIG. 3.3 shows a sample having a cutability rating of "3".
FIG. 3.4 shows a sample having a cutability rating of "4".
FIG. 3.5 shows a sample having a cutability rating of "5".

FIG. 25 shows a photograph of First Production Line Control Board having 20.0% Newsprint/8.0% Starch conditioned at 70° F./50% RH of Example 4.

FIG. 26 shows a photograph of First Production Line Trial 1 Board having 12.0% Newsprint/10.0% Starch conditioned at 70° F./50% RH of Example 4.

FIG. 27 shows a photograph of First Production Line Control Board having 20.0% Newsprint/8.0% Starch conditioned at 90° F./90% RH of Example 4.

FIG. 28 shows a photograph of First Production Line Trial 1 Board having 12.0% Newsprint/10.0% Starch conditioned 90° F./90% RH at of Example 4.

FIG. 29 shows a photograph of Second Production Line Control Board having 20.0% Newsprint/8.0% Starch conditioned at 70° F./50% RH of Example 4.

FIG. 30 shows a photograph of Second Production Line Trial 1 Board having 15.0% Newsprint/9.0% Starch conditioned at 70° F./50% RH of Example 4.

FIG. 31 shows a photograph of Second Production Line Trial 2 Board having 12.0% Newsprint/10.0% Starch conditioned at 70° F./50% RH of Example 4.

FIG. 32 shows a photograph of Second Production Line Control Board having 20.0% Newsprint/8.0% Starch conditioned at 90° F./90% RH of Example 4.

FIG. 33 shows a photograph of Second Production Line Trial 1 Board having 15.0% Newsprint/9.0% Starch conditioned at 90° F./90% RH of Example 4.

FIG. 34 shows a photograph of Second Production Line Trial 2 Board having 12.0% Newsprint/10.0% Starch conditioned at 90° F./90% RH of Example 4.

DETAILED DESCRIPTION OF THE PREFERRED EMBODIMENTS

Figure 1:
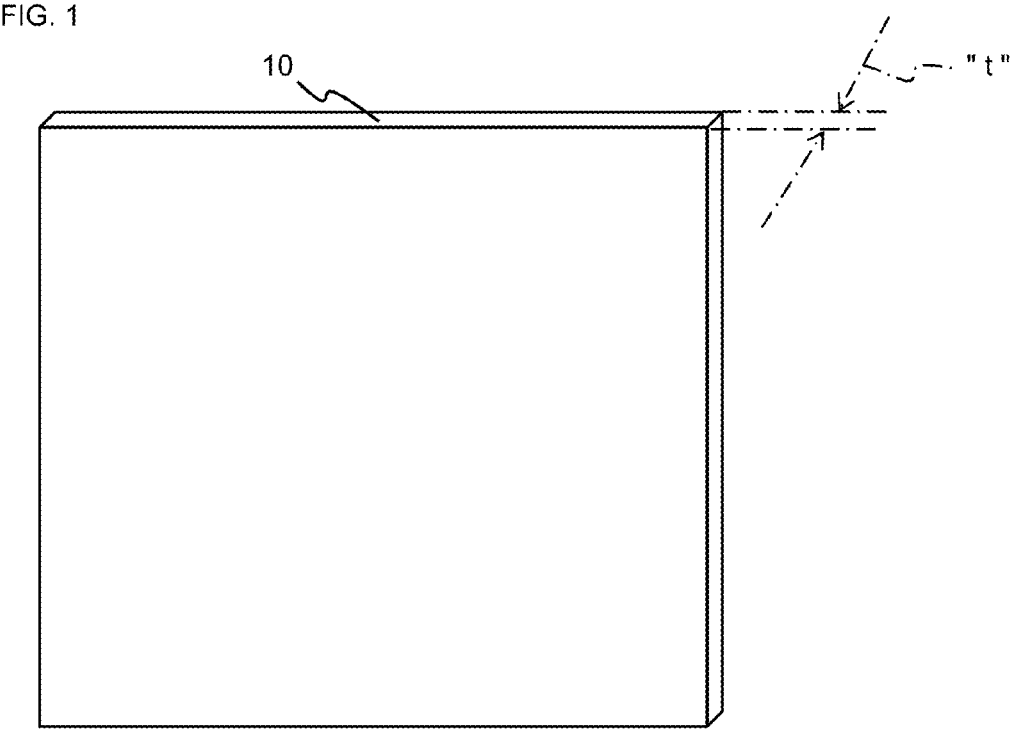
FIG. 1 shows an acoustical ceiling tile of the present invention.

FIG. 1 shows an acoustical ceiling tile 10 of the present invention.

Ceiling tiles or panels are commonly used to construct a suspended ceiling. The tiles are laid in a rectangular grid and typically have nominal face dimensions of 2'×2' and 2'×4', or metric equivalents of these dimensions. A generally conventional wet felting process, known in the art, is used to produce a tile base mat in accordance with the present invention. In such a process, the base mat constituents are mixed in a water slurry which is deposited on a moving wire to form a layer of the mat material at some specified thickness. The material layer gravity drains and can be subsequently subjected to vacuum and pressing to draw off additional water content. Such vacuuming and pressing steps may be repeated. After this mechanical dewatering, the material can be conveyed to a dryer where remaining water is evaporated out of the mat and a binder in the mat formulation is optionally caused to set or cure.

The invention involves a discovery of a combination of starch binder and cellulose material in the form of newsprint, and their relative proportions in weight ratios of starch to newsprint, that produce a ceiling tile base mat with improved processing characteristics like ease of cutting and final tile appearance, in addition to acceptable material properties and performance characteristics.

The invention provides an acoustical tile comprising:
   8.0 to 25.0 wt %, preferably 8.0 to 20.0 wt %, more preferably 15.0 to 20.0 wt % mineral wool,
   9.0 to 15.0 wt %, preferably 9.5 to 13.0 wt %, more preferably 9.5 to 10.5 wt % starch binder,
   9.0 to 15.0 wt %, preferably 10.0 to 14.5 wt %, more preferably 12.0 to 14.0 wt % cellulosic fiber, preferably the cellulosic fiber is newsprint, and
   40.0 to 65.0 wt %, preferably 45.0 to 65.0 wt %, more preferably 55.0 to 65.0 wt % perlite;
   wherein the weight ratio of the starch to the cellulosic fiber is 0.6 to 1.3:1.0, preferably 0.7 to 1.0:1.0, more preferably 0.7 to 0.9:1.0, most preferably 0.7 to 0.8:1.0.

The invention provides a process for manufacturing the acoustical tile in a water-felting process, the process comprising:
   mixing an aqueous slurry comprising water and, ingredients comprising on a water free-basis:
   8.0 to 25.0 wt %, preferably 8.0 to 20.0 wt %, more preferably 15.0 to 20.0 wt % mineral wool,
   9.0 to 15.0 wt %, preferably 9.5 to 13.0 wt %, more preferably 9.5 to 10.5 wt % starch binder,
   9.0 to 15.0 wt %, preferably 10.0 to 14.5 wt %, more preferably 12.0 to 14.0 wt % cellulosic fiber, preferably the cellulosic fiber of any of these three ranges is newsprint, and
   40.0 to 65.0 wt %, preferably 45.0 to 65.0 wt %, more preferably 55.0 to 65.0 wt % perlite;

wherein the weight ratio of the starch to the cellulosic fiber is 0.6 to 1.3:1.0, preferably 0.7 to 1.0:1.0, more preferably 0.7 to 0.9:1.0, most preferably 0.7 to 0.8:1;

continuously flowing the slurry onto a moving foraminous support wire to form a cake;

dewatering the cake to form a base mat; and drying the base mat to produce the acoustical tile.

Figure 2:
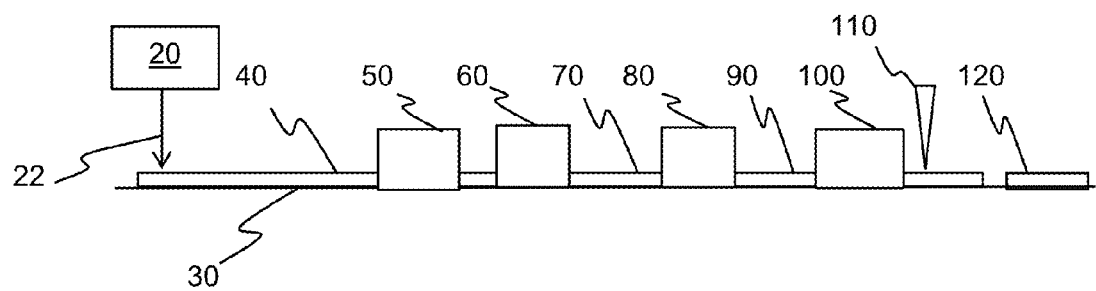
FIG. 2 schematically shows a water felting line to perform the process for making acoustical tile of the present invention.

FIG. 2 schematically shows a water felting line to make the acoustical tile of the present invention. As shown in FIG. 2, in the process, the aqueous slurry 22 of the composition is flowed from an agitated holding tank 20 onto a moving foraminous support wire 30 where it forms the cake 40 which is dewatered, first by gravity in gravity dewatering unit 50 and then by vacuum in vacuum dewatering unit 60. The dewatered cake 70 is then pressed in a pressing unit 80 to a selected thickness to form the base mat 90. The pressing step further dewaters the base mat 90. The base mat 90 is then passed into a drying kiln 100 in which the moisture in the base mat is reduced to less than 5 wt. % and preferably less than 1 wt. %. It is then cut by a blade 110 to form cut sheets 120 for acoustical tile.

The water felted base mat acoustical tile described hereinafter being dried is typically top coated with a paint-like coating to improve its light reflectance and appearance as a finished panel or tile as is customary in the industry. Before top coating, the acoustical tile can be ground to produce a relatively smooth surface. Additionally, the face of the acoustical tile can be perforated and fissured to improve its sound absorption performance.

The acoustical tile of the invention, as well as the acoustical tile and the slurry in the process for making the acoustical tile of the invention, preferably has an absence of glass beads.

The acoustical tile of the invention, as well as the acoustical tile and the slurry in the process for making the acoustical tile of the invention, preferably has an absence of clay.

The acoustical tile of the invention, as well as the acoustical tile and the slurry in the process for making the acoustical tile of the invention, preferably has an absence of vermiculite.

The acoustical tile of the invention, as well as the acoustical tile and the slurry in the process for making the acoustical tile of the invention, preferably has an absence of gypsum.

The acoustical tile of the invention, as well as the acoustical tile and the slurry in the process for making the acoustical tile of the invention, preferably has an absence of calcium carbonate.

The acoustical tile of the invention, as well as the acoustical tile, as well as the slurry in the process for making the acoustical tile of the invention, preferably has an absence of magnesium carbonate.

The acoustical tile of the invention, as well as the acoustical tile and the slurry in the process for making the acoustical tile of the invention, preferably has an absence of zinc pyrithione.

Preferably the acoustical tile of the invention, as well as the acoustical tile and the slurry in the process for making the acoustical tile of the invention, has an absence of all the following ingredients: glass beads, clay, vermiculite, gypsum, calcium carbonate, and magnesium carbonate.

Preferably the acoustical tile of the invention, as well as the acoustical tile and the slurry of the process for making the acoustical tile of the invention, on a water free basis, has an absence of inorganic material other than perlite and mineral wool. This exclusion is on a water free basis so it does not exclude water.

TABLE 1, lists compositions of the acoustical tile of the invention, as well as the acoustical tile and the slurry of the process for making the acoustical tile of the invention. Each "Preferred" range or "More Preferred" range is individually a preferred range or more preferred range for the invention. Thus, preferably any "Preferred" range can be independently substituted for a corresponding "Useable range". Likewise, more preferably any "More Preferred range" can be independently substituted for a corresponding "Useable" range or a corresponding "Preferred range".

TABLE 1

| Compositions (weight percents on a water free basis) | | | |
| --- | --- | --- | --- |
| Component | Useable | Preferred | Most Preferred |
| Mineral Wool (wt. %) | 8 to 25 | 8 to 20 | 15 to 20 |
| Binder (starch) (wt. %) | 9 to 15 | 9.5 to 13 | 9.5 to 10.5 |
| Cellulosic fiber (preferably newsprint) (wt. %) | 9 to 15 | 10 to 14.5 | 12 to 14 |
| perlite (wt. %) | 40 to 65 | 45 to 65 | 55 to 65 |
| Weight Ratio of Starch to Cellulosic fiber | 0.6 to 1.3:1 | 0.7-1.1:1 | 0.7 to 0.9:1 |

The proportions of the ingredients for a product, or used in a process, of the present invention fall within the ranges specified in TABLE 1. Variation in the proportions of ingredients can be made within the broader ranges of starch and newsprint, without a significant loss of performance. Cornstarch is the preferred binder. A practical acoustical tile of the invention preferably has a nominal thickness "t" (FIG. 1) of about ⅜ inches to 1 inch thick, more preferably about ⅝ to ⅞ inch. Also, a practical acoustical tile of the invention has a density of about 10 to 17 pounds/cubic foot.

The combination of starch and newsprint fiber in the specified weight ratios of TABLE 1, improves the hardness of the final tile. This hardness of the tile allows for improved ease of cutting with better cut appearance and reduces cutting force when handling the dried mat tile under humid conditions. This reduces scrap and the time to cut the tile to make the product.

Mineral Wool

The disclosed acoustical tile/panel compositions also contain mineral wool of the type conventionally used in acoustical tiles. Mineral wool in a ceiling tile increases the sound absorption (NRC) of the tile. In general, the higher the amount of mineral wool the better the sound absorption. Mineral wool also advantageously gives bulking to the slurry during formation of the core. The mineral wool may be any of the conventional mineral fibers prepared by attenuating a molten stream of basalt, slag, granite or other vitreous mineral constituent. The molten mineral is either drawn linearly through orifices, commonly referred to as textile fiber, or it is recovered tangentially off the face of a spinning cup or rotor, commonly referred to as wool fiber. The mineral wool constituent is present in an amount ranging from 8.0 to 25.0 wt %, more preferably 8.0 to 20.0 wt %, most preferably 15.0 to 20.0 wt %.

Binder

The binder comprises starch and mixtures thereof.

Starch is the preferred binder and may or may not be cooked prior to use. A starch gel may be prepared by dispersing starch particles in water and heating the slurry until the starch is fully or partially cooked and the slurry thickens to a viscous gel. However, if conventional hydropulped fibers are used as a supplemental source of fiber, they may be incorporated into the starch slurry prior to cooking. The cooking temperature of the starch slurry should be closely monitored to assure the desired degree of swelling of the starch granules. The cooking temperature for cornstarch can range from about 160° F. (71° C.) to about 195° F. (90° C.). Starch may also be used as a binder without pre-cooking the starch, because it forms a gel during the process of drying the base mat. Cornstarch is the preferred binder. Preferably the binder is solely cornstarch. Preferably the binder has an absence of latex. Preferably the binder has an absence of polyamine epichlorohydrin resins.

Increased binder content, in the form of starch, can be used to increase strength (MOR-modulus of rupture (psi)) and hardness and enhance the cutability of the finished tiles/panels. The binder is present from 9.0 to 15.0 wt %, preferably from 9.5 to 13.0 wt %, more preferably from 9.5 to 10.5 wt % in the product and process of the present invention.

Cellulosic Fibers

A major component in the acoustical tile compositions of this invention is the cellulosic fiber, which serves to provide both wet strength (i.e., the strength of the wet mat prior to drying). The cellulose fiber may also function as a binder and may help to retain fines. Preferably the cellulosic fiber is newsprint (also known as ("news"). It is well known to use newsprint in acoustical tile formulations. In acoustical tile formulations of the present invention, hydro-pulped newsprint is preferred. Refined paper fibers and wood fiber may also be used as the source of the cellulosic fiber, however, it has been found ceiling tiles made with wood fiber, either softwood or hardwood, are more difficult to cut with a knife at the installation site. Furthermore, wood fibers are a more expensive source of the cellulosic fiber. The cellulosic fiber is present from 9.0 to 15.0 wt %, preferably from 10.0 to 14.5 wt %, more preferably from 12.0 to 14.5 wt %, most preferably from 12.0 to 14.0 wt % in the product and process of the present invention.

The acoustical tile of the invention, as well as the acoustical tile and the slurry of the process for making the acoustical tile of the invention, preferably has 0% of the cellulosic fiber provided by paper sludge obtained from pulp and paper processing waste.

Perlite

An ingredient of the disclosed acoustical tile compositions is a perlite. Expanded perlite is preferred for its low cost and performance. The expanded perlite provides porosity and "loft" in the final product, which enhances acoustical properties.

Perlite is a form of glassy rock, similar to obsidian with the capacity to expand greatly on heating. Perlite generally contains 65-75 wt % $SiO_2$, 10-20 wt % $Al_2O_3$, 2-5 wt % $H_2O$, and smaller amounts of sodium, potassium, iron and calcium oxides. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional process of preparing expanded perlite, the perlite ore is first ground to a fine size. The perlite is expanded by introducing the finely ground perlite ore into the heated air of a perlite expander. Typically the expander heats the air to about 1750° F. The finely ground perlite is carried by the heated air which heats the perlite and causes it to pop like popcorn to form the expanded perlite having a density of about 3 to 10 pounds per cubic foot. When expanded perlite is placed in contact with water, the water penetrates the cracks and fissures and enters into the air filled cavities of the perlite, thereby causing the perlite to retain large amounts of water within the expanded perlite particles.

Using the relatively high density perlite, i.e., a perlite which has been expanded to a density of over 7 or 8 pounds per cubic foot (versus the normal range of 3 to 5 pounds per cubic foot), lowers the water needed to form a suitable slurry. See, U.S. Pat. No. 5,911,818 to Baig. The aqueous slurry with less water requires less dewatering, and produces a base mat having less water retained by the perlite. The resulting product has improved compressive resistance and maintained fire ratings, as defined by ASTM Test No. E119. The base mat having a lower water content can be dried faster which allows the entire water felting line to be run at higher speed.

High density perlite is also beneficial when manufacturing fire rated ceiling tiles which must meet a minimum density. However, when the density of the expanded perlite exceeds about 20 pounds per cubic foot, the perlite does not produce as much "loft" or bulk in the final product. As a result, the density of the final product may be too high to maintain the low thermal conductivity required to pass the ASTM E119 fire endurance test.

The disclosed ceiling tile compositions contain from 40.0 to 65.0 wt % perlite of either the high or low density type, preferably 45.0 to 65.0 wt %, more preferably 55.0 to 65.0 wt %.

Prior to use in the sound-absorbing filler, the expanded perlite is optionally at least partially coated with a coating. Preferred coatings include silicon coatings and polymeric coatings. The coatings are applied to the expanded perlite using any practical coating method. Spraying is the preferred method of applying the coating. While not wishing to be bound by theory, it is believed the coating limits water absorption by reducing the amount of water that enters the interior of the aggregate particles. When less water is absorbed, less energy is required to drive off this excess water, reducing the kiln temperature or the residence time of the product in the kiln.

Inorganic Materials

Commercial clays include kaolin, bentonite, and other clays known to those skilled in the art of ceiling tile fabrication can be added to mixtures for acoustical tiles of the present invention. Addition of these ingredients is optional and not preferred. Preferably there is an absence of these ingredients.

Calcium carbonate ($CaCO_3$) is a typical material that has no significant value in the board properties except it may give some hardness to the product and it can lower the cost of the product. Addition of this ingredient is optional and not preferred. Preferably there is an absence of this ingredient.

Other commonly used low cost inorganic materials are gypsum and fly ash. The gypsum may be of any form. Typical forms are calcium sulfate dihydrite, $CaSO_4.2H_2O$ (which can be in the form of re-hydrated hemihydrate, for example); calcium sulfate hemihydrate, $CaSO_4 \cdot \frac{1}{2}H_2O$; or calcium sulfate anhydrite, $CaSO_4$. Gypsum has limited solubility in water and acts as a flocculent. By functioning as a flocculent in the slurry, the gypsum helps to retain and uniformly distribute the fine particles (inorganic clay, organic starch, short cellulosic fibers, etc.) in the mat during the processing (dewatering, vacuum and wet pressing).

Gypsum may be present from 0 to 30.0 wt %. However, addition of this ingredient is optional and not preferred. Preferably there is an absence of this ingredient.

Fly ash may be present from 0 to 30.0 wt %. However, addition of this ingredient is optional and not preferred. Preferably there is an absence of this ingredient.

Optional Additional Ingredients

An optional facing material is a scrim layer. It is positioned, for example, on the front face of the base mat of the acoustical panel. A scrim layer is also useful on the back face of the base mat (core) of the acoustical panel. Preferably, the scrim layer is porous to facilitate attachment to the base mat and is acoustically transparent. Any material that has these properties is useful as scrim material. Some examples of suitable scrims include non-woven fiberglass scrims, woven fiberglass mats, other synthetic fiber mats such as polyester and combinations thereof.

The invention can have an absence of any of these optional elements.

The following specific examples further illustrate embodiments of the invention. Unless specified to the contrary, all amounts are expressed as parts by weight on a dry solids total weight basis. Also, unless specified to the contrary, all amounts are expressed as percent are in weight percent. These examples are for illustration only and are not to be construed as limitations on this disclosure.

EXAMPLES

Example 1

The present report presents the results of a lab board series in which the percentages of starch and newsprint were systematically varied (see TABLE 2 for formulation and preparation details and cutability; see TABLE 3 for board properties) to determine the effect of these variables on board properties including cutability under high humidity conditions. This example studied whether, it was possible to achieve a harder core that exhibits improved cutability under high humidity conditions by varying the ratio and total amount of starch and newsprint.

TABLE 2

Board composition and preparation details

| Board Comp. No. | News (%) | News (grams) (2.4% solids) | Starch (%) | Starch (grams) | Clay (%) | Clay (gms) | Water (lbs) | Average Cutability Rating 70° F./ 50% RH | Average Cutability Rating 90° F./ 90% RH |
|---|---|---|---|---|---|---|---|---|---|
| 1 | 19.5 | 3674 | 7.5 | 33.6 | 4.0 | 17.94 | 13.07 | 3.7 | 5.0 |
| 2 | 17.0 | 3203 | 7.5 | 33.6 | 6.5 | 29.15 | 14.09 | 3.5 | 4.9 |
| 3 | 14.5 | 2732 | 7.5 | 33.6 | 9.0 | 40.36 | 15.10 | 3.8 | 4.8 |
| 4 | 12.0 | 2261 | 7.5 | 33.6 | 11.5 | 51.57 | 16.11 | 3.8 | 4.0 |
| 5 | 9.5 | 1790 | 7.5 | 33.6 | 14.0 | 62.78 | 17.13 | 3.8 | 4.0 |
| 6 | 10.0 | 1884 | 10.0 | 44.8 | 11.0 | 49.33 | 16.93 | 1.4 | 2.9 |
| 7 | 12.0 | 2261 | 10.0 | 44.8 | 9.0 | 40.36 | 16.11 | 2.4 | 2.9 |
| 8 | 14.5 | 2732 | 10.0 | 44.8 | 6.5 | 29.15 | 15.10 | 1.7 | 3.0 |
| 9 | 17.0 | 3203 | 10.0 | 44.8 | 4.0 | 17.94 | 14.09 | 2.2 | 3.4 |
| 10 | 10.0 | 1884 | 12.5 | 56.0 | 8.5 | 38.12 | 16.93 | 1.0 | 1.2 |
| 11 | 12.0 | 2261 | 12.5 | 56.0 | 6.5 | 29.15 | 16.11 | 1.0 | 2.9 |
| 12 | 14.5 | 2732 | 12.5 | 56.0 | 4.0 | 17.94 | 15.10 | 1.0 | 2.9 |
| 13 | 17.0 | 3203 | 12.5 | 56.0 | 1.5 | 6.73 | 14.09 | 1.0 | 3.1 |

TABLE 3

Board Properties

| | |
|---|---|
| Board Target Thickness | 0.600 (inches) |
| Board Target Density | 13.0 (pounds per cubic foot) |
| Stock Consistency | 4.5% solids in a slurry wherein the remainder is water |
| Cationic polyacrylamide flocculent | 0.08% or 179.7 grams of 0.2% flocculent solution per lab board |

A series of 26 lab scale boards were produced using the compositions presented in TABLE 2 (two boards of each of the thirteen compositions) and using the standard lab board preparation method as follows.

Lab Board Making Procedure:

Weigh out water and place in mix bucket.

Add paper fiber, mineral wool, clay and perlite in a bucket with appropriate mixing. Add flocculent at end of mixing cycle.

Place nonwoven scrim on wire in lab scale forming box and fill the box to a level that covers the scrim.

Add slurry to lab scale forming box. Open bottom valve and allow slurry to drain to form a felted mat.

Apply to the felted mat vacuum, pressing and then additional vacuum to remove excess water.

Then weigh the formed mat.

Transfer to oven. All boards were dried at 600° F. with steam to fully cook the starch within the formed base mat followed by drying without steam at 300° F. to constant weight.

The dry boards were conditioned for 24 hours at 70° F./50% RH prior to physical testing using established lab physical test methods. For cutability testing, the boards were conditioned at either 70° F./50% RH or 90° F./90% RH using a spacing rack for 3 days prior to testing.

The boards were tested for cutability. The boards were also tested for the Physical Test Results of Modulus of Rupture (MOR)(psi), Corrected MOR (CMOR)(psi), MOE (psi), and 2 inch Ball Hardness (lb-f), using modified test methods as presented in ASTM C367. The modifications relative to the stated ASTM C367 requirements are relatively minor and would not substantively affect the results or conclusions (see below).

For MOR the tests conformed to the basic testing parameters of this standard; although the tests utilized a shorter span than what is specified in ASTM C367 (i.e., 8" versus the specified 10"). This change should not make a material difference in the test results.

Corrected MOR is a calculated value not subject to ASTM C367.

For Hardness the tests conformed to the basic testing parameters of this standard; although the tests did not routinely "condition" the samples under 70/50 conditions prior to testing as required by the standard.

Loss on Ignition (LOI)(%) was measured after heating the sample to 1000° F. (538° C.) for about 30 minutes.

MOE refers to "Modulus of Elasticity" and is a measure of the relative stiffness of the test sample. A sample with a higher MOE value will deflect less under a given load. The units for MOE are psi.

Cutability Test Results

Figure 3:
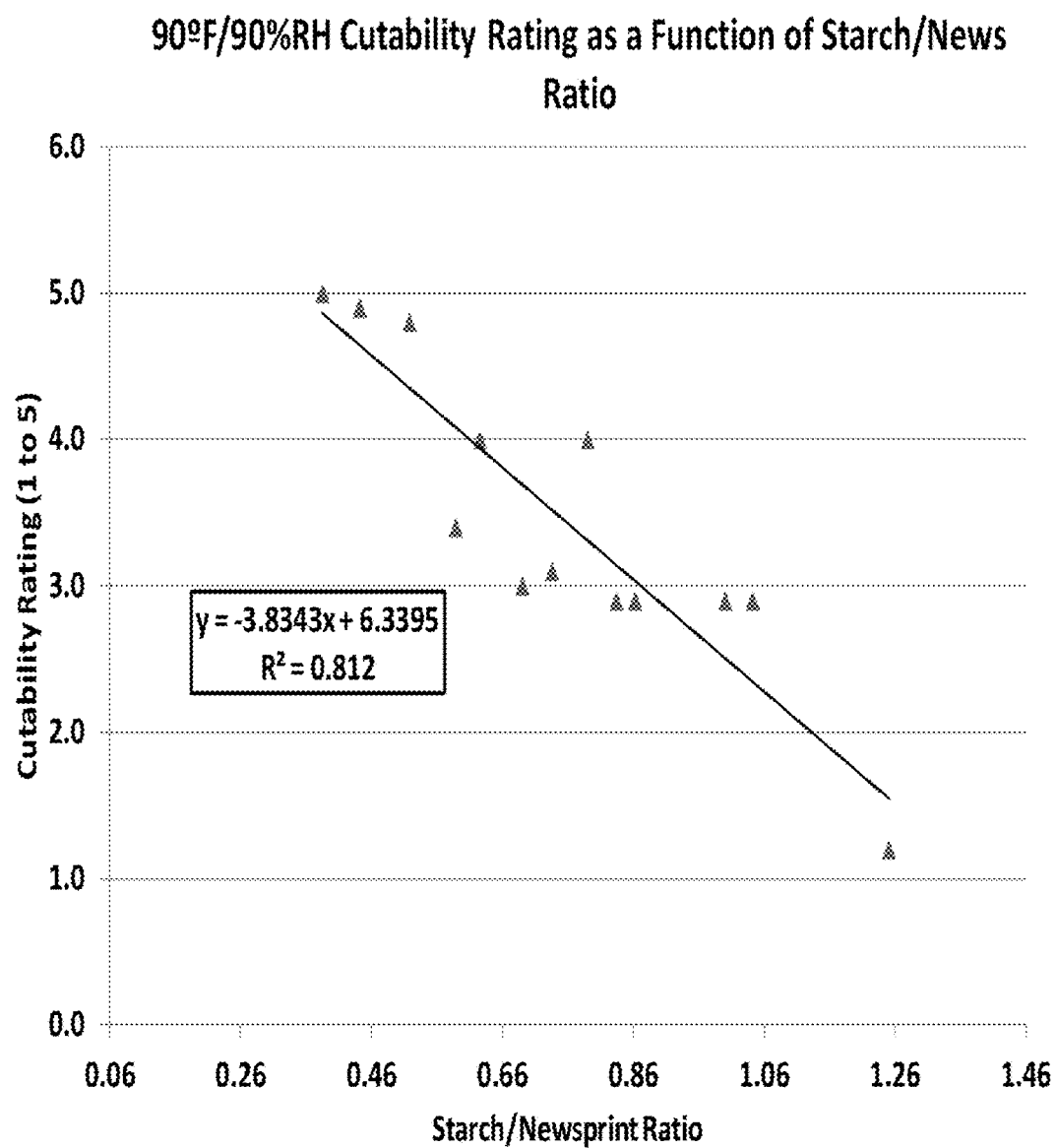
FIG. 3 shows a plot of 90° F./90% Relative Humidity (RH) Cutability Rating as a Function of Starch/Newsprint Ratio data from Example 1.
Figure 4:
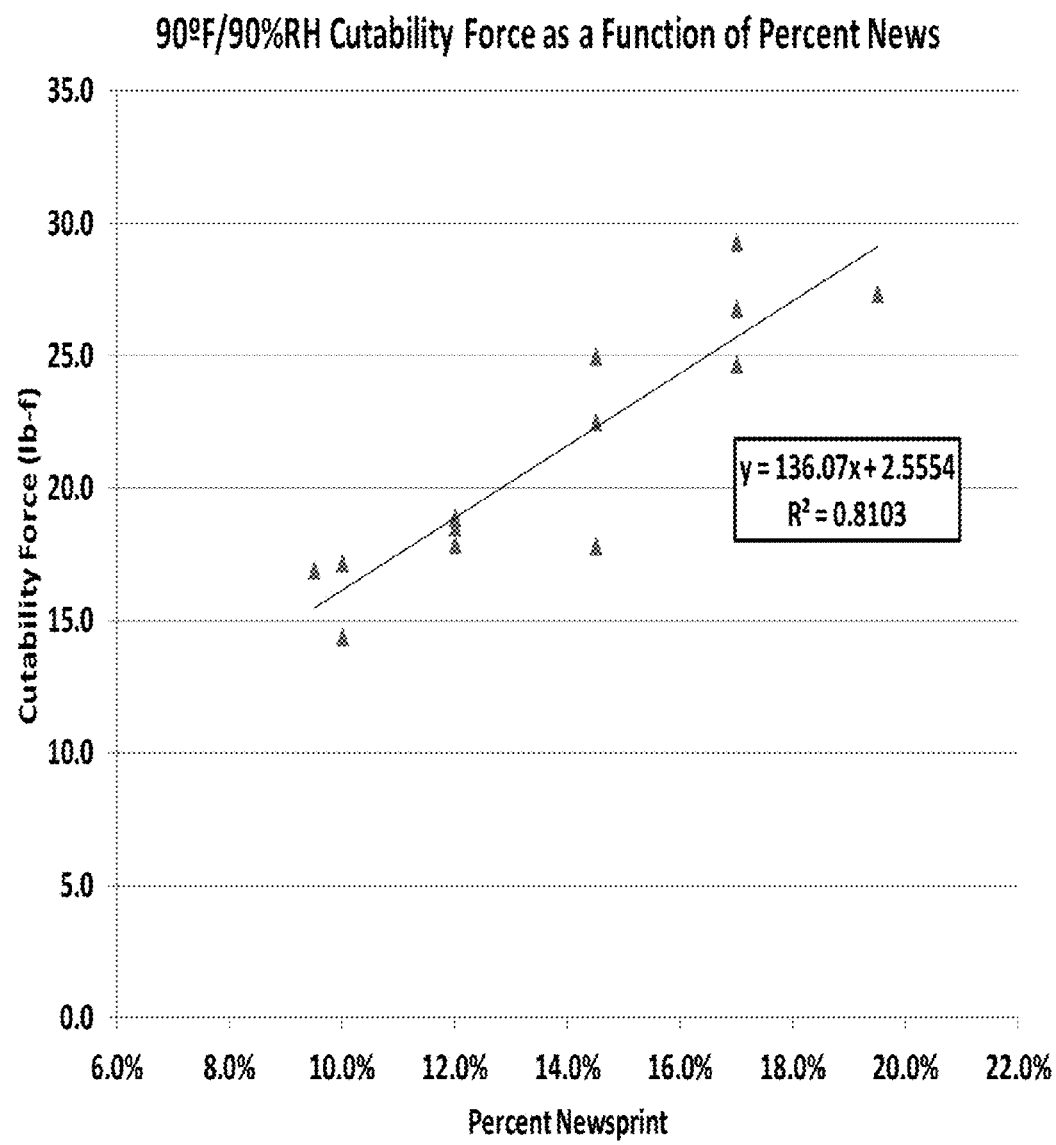
FIG. 4 shows a plot of 90° F./90% Relative Humidity Cutability Force as a Function of Percent Newsprint data from Example 1.

The results of cutability testing are presented in TABLE 2, FIG. 3, and FIG. 4. The data shows in terms of the cutability rating (i.e., the cleanness of the cut), the ratio of starch to newsprint was the controlling factor. By adjusting this ratio and keeping the mineral wool and perlite percentages relatively constant it was possible to achieve a cutability rating of near "1" even when tested at 90° F./90% RH conditions (see cutability photographs of FIGS. 5-10).

FIG. 3 shows a plot of 90° F./90% Relative Humidity Cutability Rating as a Function of Starch/Newsprint Ratio data from Example 1. Each rating of the cutability Rating System has a number from 1 to 5. 1=perfect, 2=good, 3=fair, 4=poor, and 5=unacceptable (judged by smoothness of cuts). A rating of "perfect" denoted a completely smooth cut upon drawing a utility knife through the full thickness of the panel. An "unacceptable" rating denoted a very ragged edge that is aesthetically objectionable. The rating of an individual tile is highly dependent on the humidity to which the tile has been subjected.

Although not necessarily from this Example, FIGS. 3.1-3.5 show examples of these cutability ratings. FIG. 3.1 shows a sample having a cutability rating of "1". FIG. 3.2 shows a sample having a cutability rating of "2". FIG. 3.3 shows a sample having a cutability rating of "3". FIG. 3.4 shows a sample having a cutability rating of "4". FIG. 3.5 shows a sample having a cutability rating of "5".

FIG. 4 shows a plot of 90° F./90% Relative Humidity Cutability Force as a Function of Percent Newsprint data from Example 1. In the cutability force test, a clean new razor blade is pulled through the full thickness of a 3" wide sample of ceiling tile. The blade is included in part of a device that draws the blade through the sample at a set speed and angle and also contains a load cell to measure force required to do so. Load (maximum pounds force) is recorded. The blade used in the cutability and cutability force tests was a STANLEY 1992 utility blade (Stanley item number 11-921B). A new blade is installed after every cut.

Figure 5:
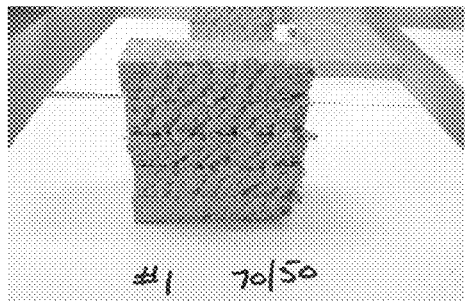
FIG. 5 shows a photograph of a first Board of composition 1 having Newsprint: 19.5%; Starch: 7.5% conditioned at 70° F./50% RH from Example 1.

FIG. 5 shows a photograph of a first Board of composition 1 having Newsprint: 19.5%; Starch: 7.5% conditioned at 70° F./50% RH.

Figure 6:
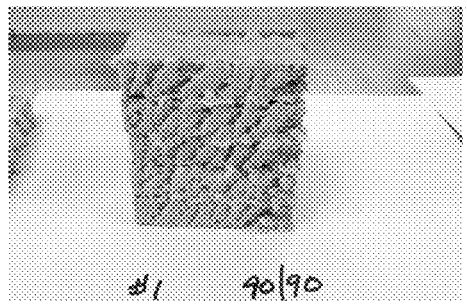
FIG. 6 shows a photograph a second Board of composition 1 having Newsprint: 19.5%; Starch: 7.5% conditioned at 90° F./90% RH from Example 1.

FIG. 6 shows a photograph a second Board of composition 1 having Newsprint: 19.5%; Starch: 7.5% conditioned at 90° F./90% RH.

Figure 7:
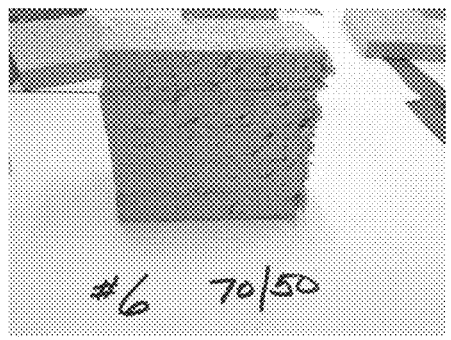
FIG. 7 shows a photograph of a first Board of composition 6 having Newsprint: 10.0%; Starch: 10.0% conditioned at 70° F./50% RH from Example 1.

FIG. 7 shows a photograph of a first Board of composition 6 having Newsprint: 10.0%; Starch: 10.0% conditioned at 70° F./50% RH.

Figure 8:
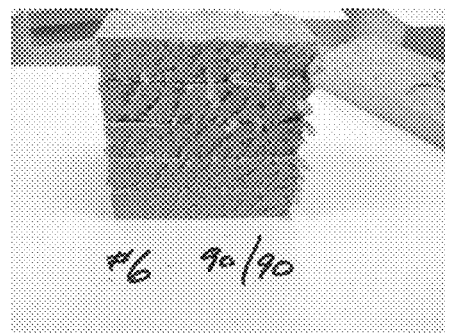
FIG. 8 shows a photograph of a second Board of composition 6 having Newsprint: 10.0%; Starch: 10.0% conditioned at 90° F./90% RH from Example 1.

FIG. 8 shows a photograph of a second Board of composition 6 having Newsprint: 10.0%; Starch: 10.0% conditioned at 90° F./90% RH.

Figure 9:
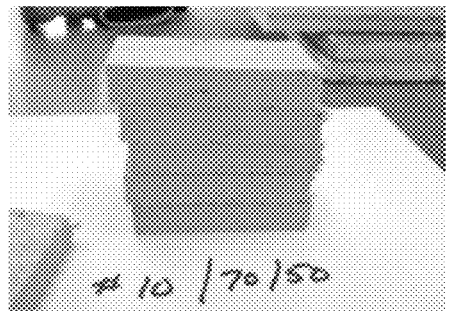
FIG. 9 shows a photograph of a first Board of composition 10 having Newsprint: 10.0%; Starch: 12.5% conditioned at 70° F./50% RH from Example 1.

FIG. 9 shows a photograph of a first Board of composition 10 having Newsprint: 10.0%; Starch: 12.5% conditioned at 70° F./50% RH.

Figure 10:
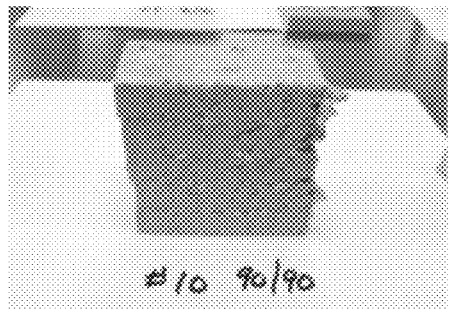
FIG. 10 shows a photograph of a second Board of composition 10 having Newsprint: 10.0%; Starch: 12.5% conditioned at 90° F./90% RH from Example 1.
Figure 11:
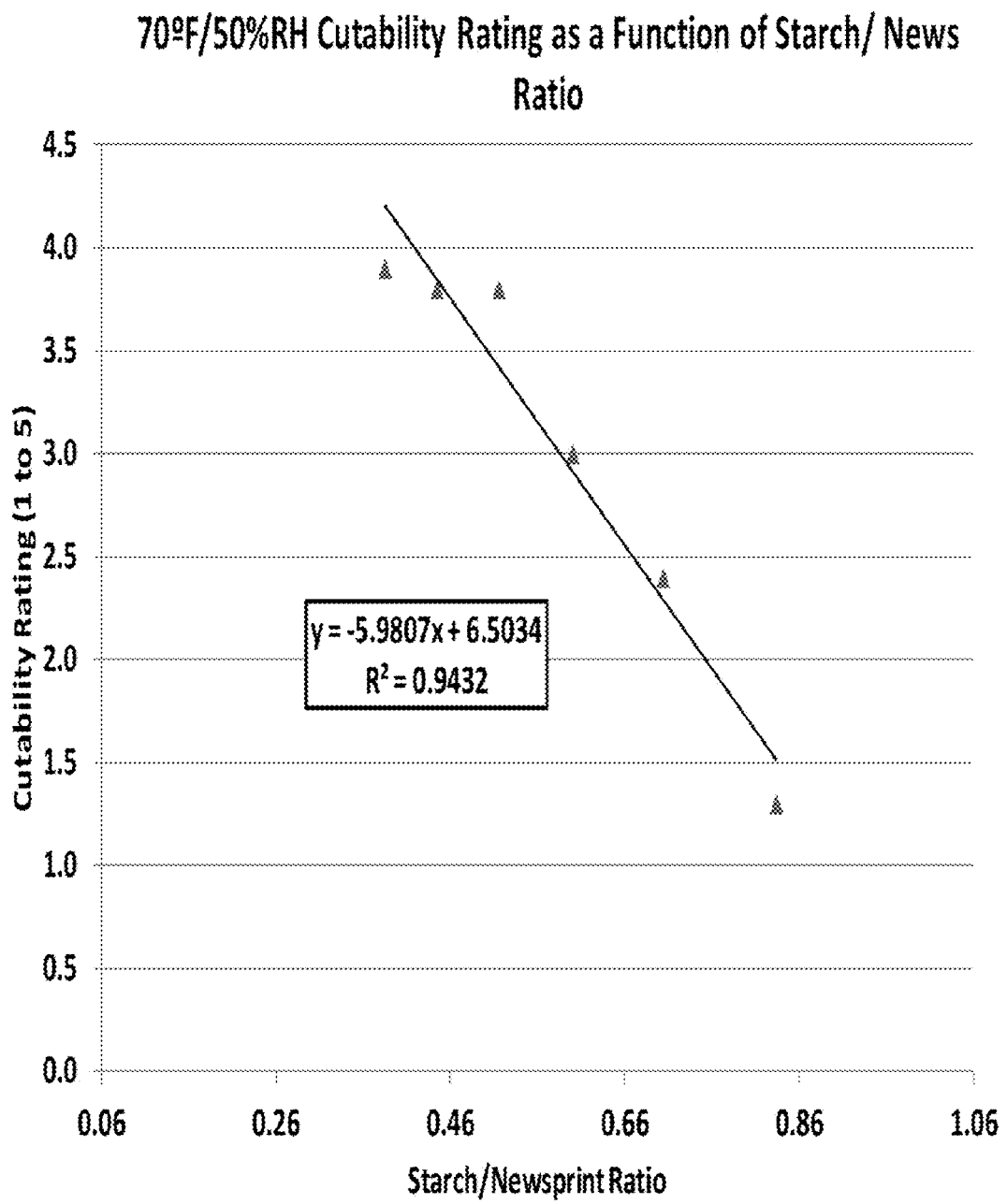
FIG. 11 shows a plot of 70° F./50% RH Cutability Rating as a Function of Starch/Newsprint Ratio data from Example 2.
Figure 12:
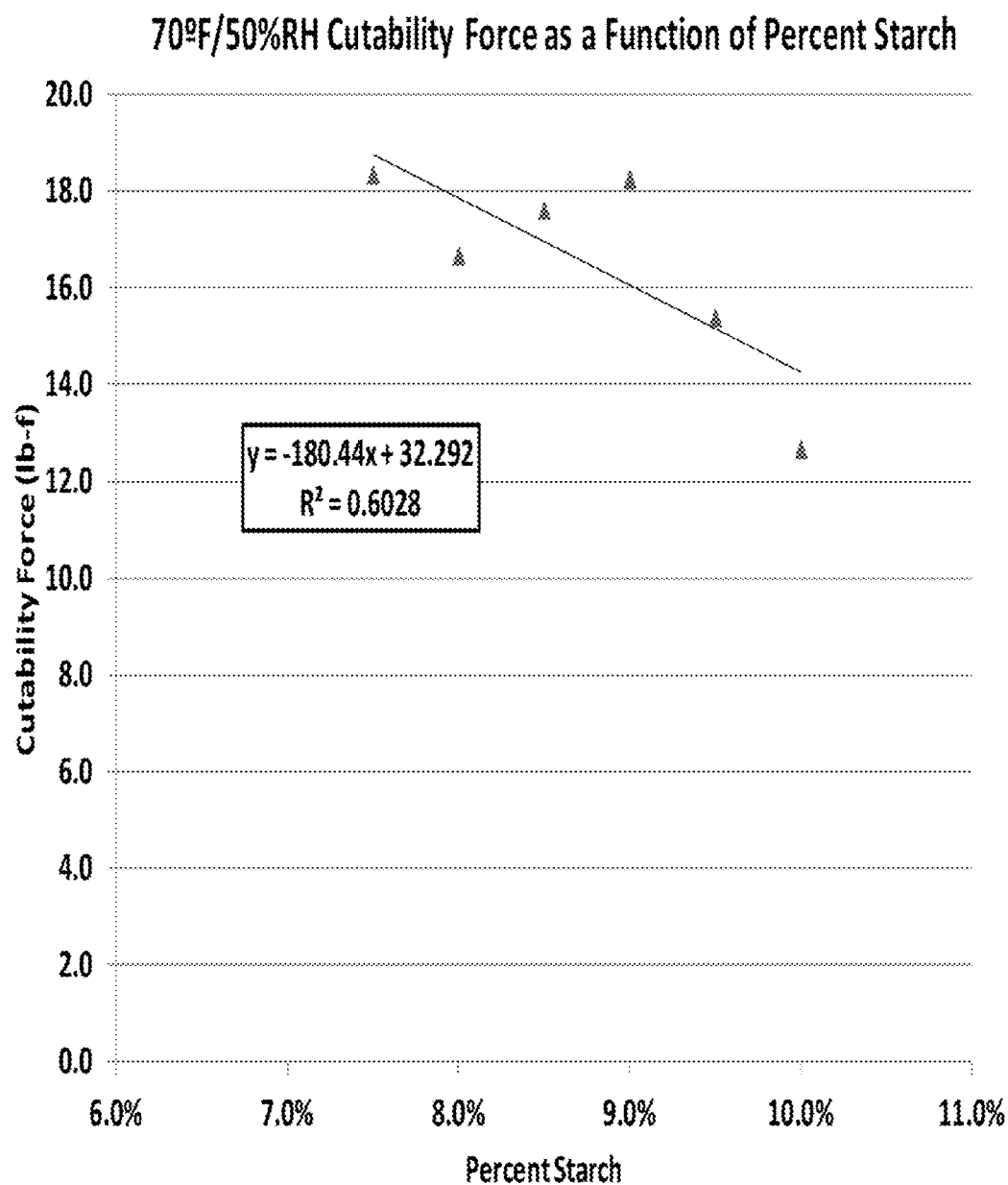
FIG. 12 shows a plot of 70° F./50% RH Cutability Force (lb-f) as a Function of Percent Starch data from Example 2.
Figure 13:
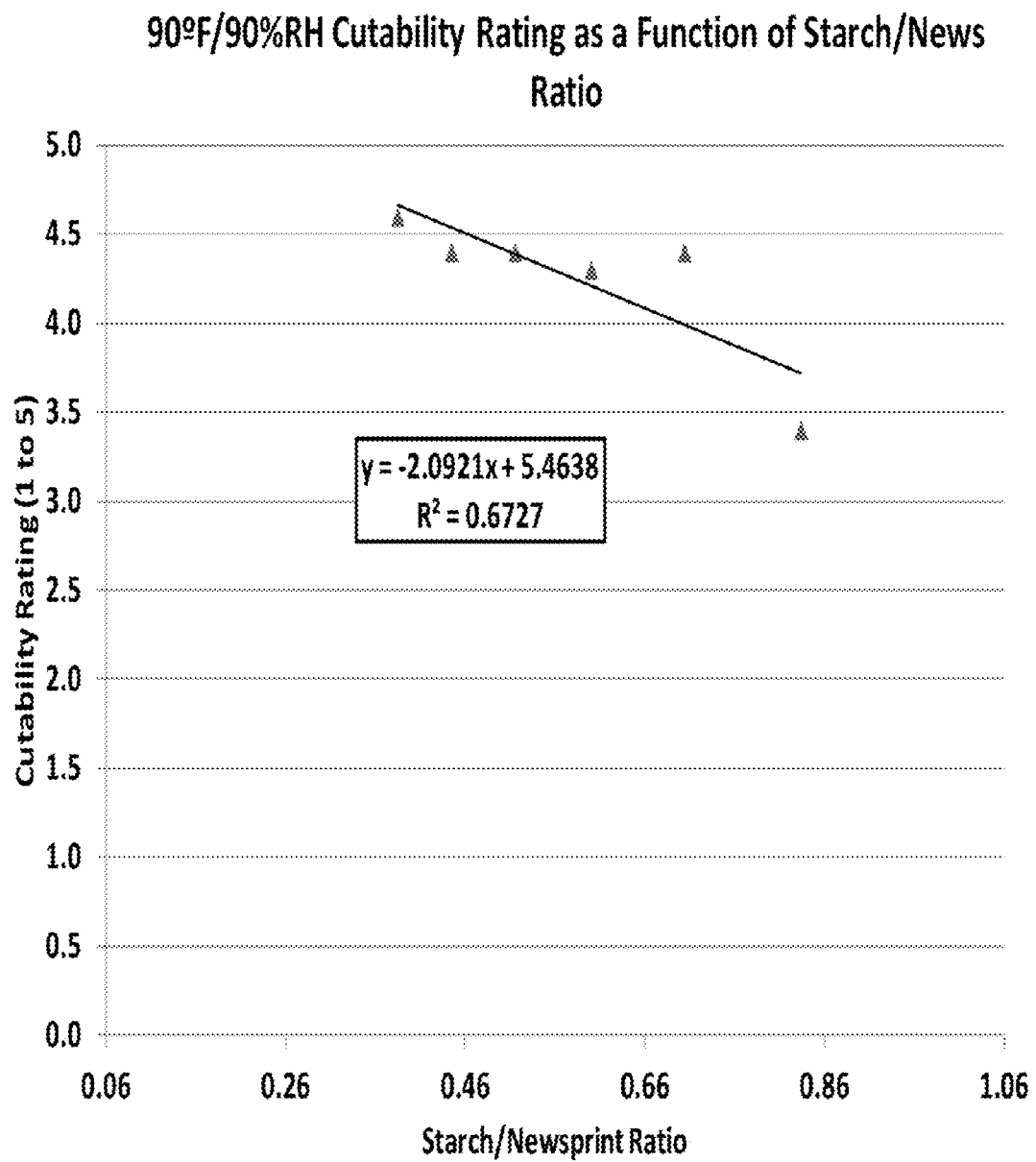
FIG. 13 shows a plot of 90° F./90% RH Cutability Rating as a Function of Starch/Newsprint Ratio data from Example 2.
Figure 14:
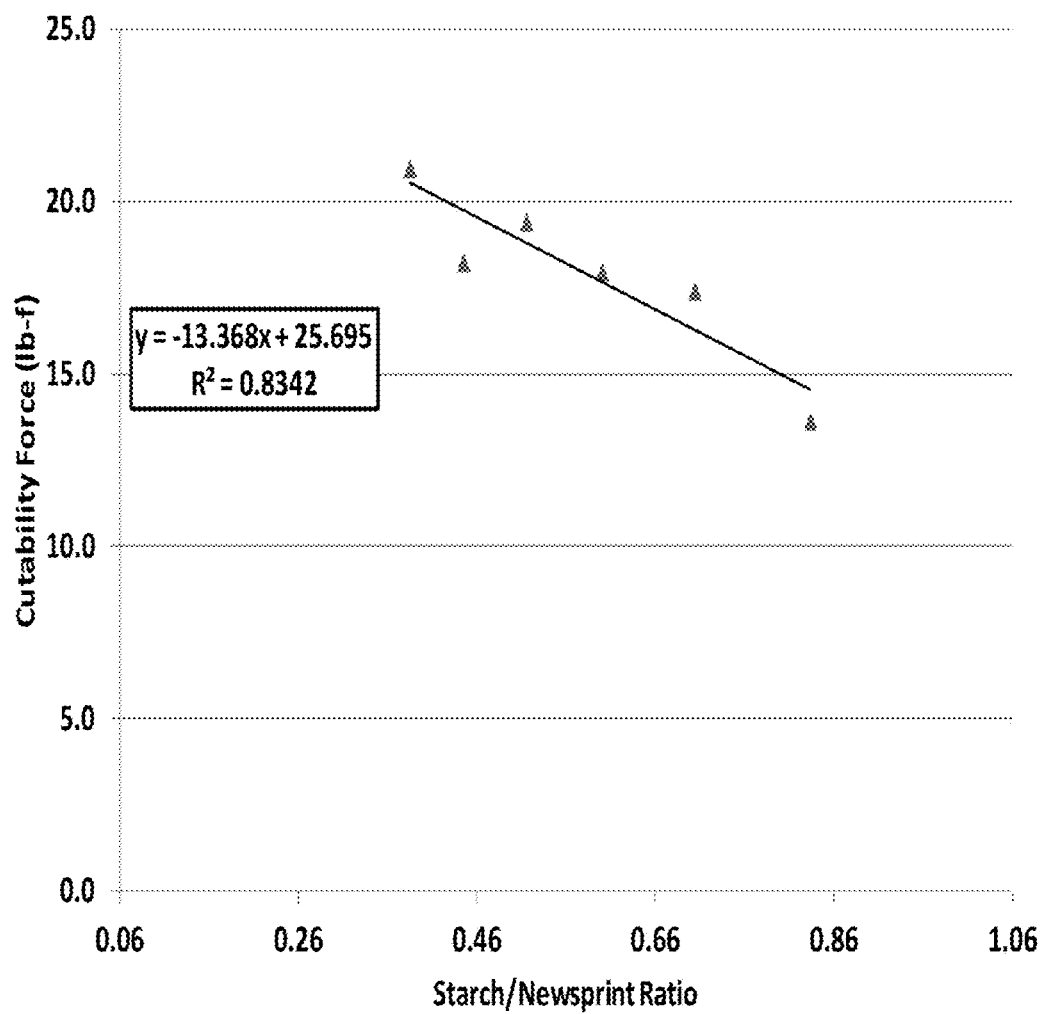
FIG. 14 shows a plot of 90° F./90% RH Cutability Force (lb-f) as a Function of Percent Newsprint data from Example 2.

FIG. 10 shows a photograph of a second Board of composition 10 having Newsprint: 10.0%; Starch: 12.5% conditioned at 90° F./90% RH.

In terms of the cutability force (i.e., the force required to draw the knife through the panel), the percentage of newsprint appears to be the controlling factor. Minimizing the percentage of newsprint provides the smoothest and the easiest cut.

TABLE 4 summarizes the Cutability Test Results and Physical Test Results of Modulus of Rupture (MOR) (psi), Corrected MOR (CMOR)(psi), MOE (psi), 2 inch Ball Hardness (lb-f), and MOE for boards of selected compositions.

TABLE 4

| Board Composition No. | Newsprint (wt. %) | Starch (wt. %) | MOR (psi) | Corrected MOR (psi) | MOE | 2 inch Ball Hardness (lb-f) | 90° F./90% RH Cutability Rating |
|---|---|---|---|---|---|---|---|
| 1 | 19.5 | 7.5 | 130.99 | 129.57 | 16564 | 143.2 | 5.0 |
| 6 | 10.0 | 10.0 | 131.75 | 128.38 | 21519 | 143.7 | 2.9 |
| 10 | 10.0 | 12.5 | 149.32 | 149.14 | 22882 | 155.1 | 1.2 |

The above-described data shows the ratio of starch to newsprint appeared to be the controlling factor toward improving cutability. This data indicates by adjusting this ratio and keeping the mineral wool and perlite percentages relatively constant it is possible to achieve a cutability rating of near "1" when tested under 90° F./90% RH conditions.

The physical testing results indicate it should be possible to significantly reduce the level of paper fiber while only modestly increasing the level of starch and still maintain the current level of physical properties. For example, the MOR and Corrected MOR increase with less newsprint and more starch.

Example 2

Example 2 presents the results of a plant trial on a first commercial size production line in which the percentages of starch and newsprint were systematically varied (see TABLE 5 for formulation and trial details) to determine the effect of these variables on board properties including cutability under high humidity conditions. The plant trial included running five 2-hour trials using the following progression in base mat formula: Control 1 was performed first, then Trials 1-5 in order respectively, and lastly Control B.

TABLE 5

Trial Formulations (amounts in wt. % unless otherwise indicated; amounts total 100%)

| Sample | Starch wt. % | Newsprint wt. % | Wool wt. % | Perlite wt. % | Clay wt. % | Starch:Newsprint Weight Ratio |
|---|---|---|---|---|---|---|
| Control A | 7.5 | 19.5 | 14.4 | 56.6 | 2.0 | 0.38:1 |
| Trial 1 | 8.0 | 18.0 | 14.6 | 57.4 | 2.0 | 0.44:1 |
| Trial 2 | 8.5 | 16.5 | 14.8 | 58.2 | 2.0 | 0.52:1 |
| Trial 3 | 9.0 | 15.0 | 15.0 | 59.0 | 2.0 | 0.60:1 |
| Trial 4 | 9.5 | 13.5 | 15.2 | 59.8 | 2.0 | 0.70:1 |
| Trial 5 | 10.0 | 12.0 | 15.4 | 60.6 | 2.0 | 0.83:1 |
| Control B | 7.5 | 19.5 | 14.4 | 56.6 | 2.0 | 0.38:1 |

Cutability Test Results

TABLE 6 presents the results of cutability rating testing. In terms of the cutability rating (i.e., the cleanness of the cut) and cutability force, the ratio of starch to newsprint was the controlling factor when the samples were tested after 70° F./50% RH conditioning (see TABLE 6 and FIGS. 11-14). The blade used for the cutting tests is a typical "utility knife" blade. This example employed STANLEY 1992 Blades (11-921B).

TABLE 6

Results of cutability rating testing (each listed cutability value is an average of five measurements)

| Sample | Newsprint (wt. %) | Starch (wt. %) | Average Cutability Rating 70° F./50% RH | Average Cutability Rating 90° F./90% RH | Average Peak Cutability Force (lb-f) 70° F./50% RH | Average Peak Cutability Force (lb-f) 90° F./90% RH |
|---|---|---|---|---|---|---|
| Control A | 19.5 | 7.5 | 3.9 | 4.6 | 18.4 | 21.0 |
| Trial 1 | 17.0 | 8.0 | 3.8 | 4.4 | 16.7 | 18.2 |
| Trial 2 | 14.5 | 8.5 | 3.8 | 4.4 | 17.6 | 19.4 |
| Trial 3 | 12.0 | 9.0 | 3.0 | 4.3 | 18.3 | 18.0 |
| Trial 4 | 9.5 | 9.5 | 2.4 | 4.4 | 15.4 | 17.4 |
| Trial 5 | 10.0 | 10.0 | 1.3 | 3.4 | 12.7 | 13.6 |

Figure 15:
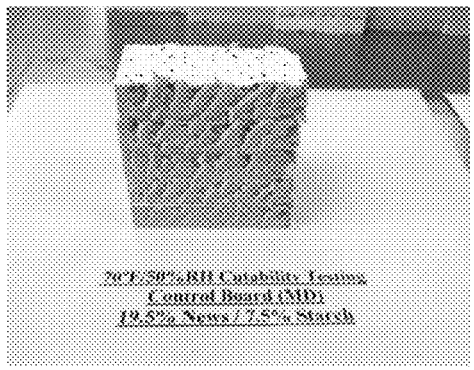
FIG. 15 shows a photograph of Control Board having Newsprint: 19.5%; Starch: 7.5% conditioned at 70° F./50% RH from Example 2.

FIG. 15 shows a photograph of Control Board having Newsprint: 19.5%; Starch: 7.5% conditioned at 70° F./50% RH.

Figure 16:
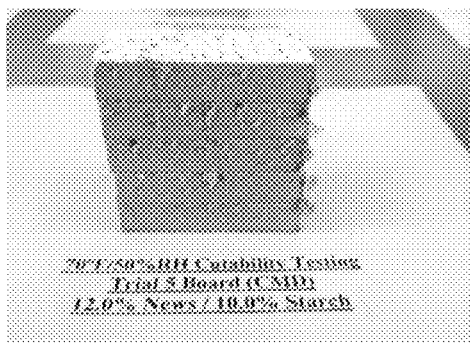
FIG. 16 shows a photograph of Trial Board 5 having Newsprint: 12.0%; Starch: 10.0% conditioned at 70° F./50% RH from Example 2.

FIG. 16 shows a photograph of Trial Board 5 having Newsprint: 12.0%; Starch: 10.0% conditioned at 70° F./50% RH.

Figure 17:
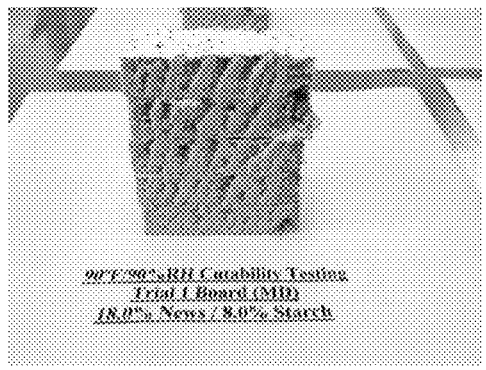
FIG. 17 shows a photograph of Trial Board 1 (which is a second Control Board) having Newsprint: 18.0%; Starch: 8.0% conditioned at 90° F./90% RH from Example 2.

FIG. 17 shows a photograph of Trial Board 1 (a second Control Board) having Newsprint: 18.0%; Starch: 8.0% conditioned at 90° F./90% RH.

Figure 18:
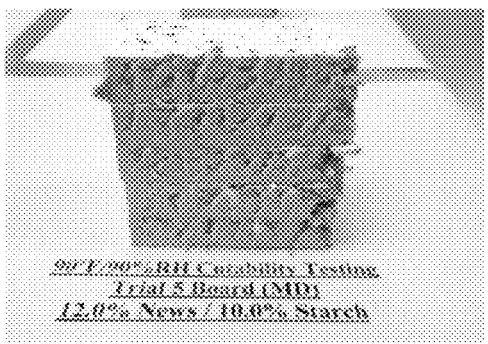
FIG. 18 shows a photograph of Trial Board 5 having Newsprint: 12.0%; Starch: 10.0% conditioned at 90° F./90% RH from Example 2.

FIG. 18 shows a photograph of Trial Board 5 having Newsprint: 12.0%; Starch: 10.0% conditioned at 90° F./90% RH.

When the same samples were tested after 90° F./90% RH conditioning, increasing the starch/newsprint ratio affected a significant improvement in cutability rating. Trial 5 boards achieved the best cutability rating. However, even the Trial 5 boards did not achieve a cutability rating of near "1" (see FIGS. 11-14 as well as the cutability photographs of FIGS. 15-18 comparing Control Boards to Trial 5 Boards).

Possible reasons for the 90° F./90% RH cutability results differing compared to the Example 1 lab board results might include the following: 1) Possible high newsprint consistencies resulting in a higher level of newsprint in the final furnish than was shown on the computer; or 2) Possible incomplete cooking of the starch in the dryer. The lab boards were thoroughly steamed to ensure complete cooking of the starch. However, it is possible the selected trial boards were not completely cooked or came from a deck in the dryer with lower temperatures.

In terms of the cutability force values (i.e., the force necessary to draw the test knife blade through the sample), the data again showed the ratio of starch to newsprint appeared to be the controlling factor when the samples were tested after 70° F./50% RH conditioning. When the same samples were tested after 90° F./90% RH conditioning, the ratio of starch to newsprint appeared to again be the controlling factor. This data confirmed a higher starch/newsprint ratio contributed to significant improvements in cutability.

Example 3

Example 3 presents the results of another plant trial on a second commercial size production line in which the percentages of starch and newsprint were systematically varied under two trial scenarios (see TABLE 7 for formulation and trial details) to determine the effect of these variables on board properties including cutability under high humidity conditions. The plant trial was conducted on the first commercial size production line of Example 2. The trial included of running two 2-hour trials using the following progression in base mat formula: Control 1 was performed first, then Trial 1, and then Trial 2. Compared to the 2% clay of Example 2, the clay level of Example 3 was 0%. This applied to both the Control board as well as the Trial 1 and Trial 2 boards.

TABLE 7

Trial Formulations (amounts in wt. % unless otherwise indicated; amounts total 100%)

| Trial | Starch | Newsprint | Wool | Perlite | Clay | Starch:Newsprint Wt. Ratio |
|---|---|---|---|---|---|---|
| Control | 8.0 | 20.0 | 20.0 | 52.0 | 0 | 0.40:1 |
| 1 | 9.0 | 15.0 | 17.0 | 59.0 | 0 | 0.60:1 |
| 2 | 10.0 | 12.0 | 17.4 | 60.6 | 0 | 0.83:1 |

Cutability Test Results

The results of cutability testing are summarized in TABLE 8. Each cutability value is the averages of 8 individual samples with each sample cut in the machine direction.

The blade used for the cutting tests is a typical "utility knife" blade in the case of the present specification STANLEY 1992 Blades (11-921B).

TABLE 8

Summary of Cutability Test Results

| Sample | Starch (wt %) | Newsprint (wt %) | Average Cutability Rating 70° F./ 50% RH | Average Cutability Rating 90° F./ 90% RH | Average Peak Cutability Force (lb-f) 70° F./50% RH | Average Peak Cutability Force (lb-f) 90° F./90% RH |
|---|---|---|---|---|---|---|
| Control | 8.0 | 20.0 | 2.59 | 3.98 | 15.62 | 18.47 |
| Trial 1 | 9.0 | 15.0 | 2.26 | 4.04 | 12.64 | 13.91 |
| Trial 2 | 10.0 | 12.0 | 1.00 | 1.68 | 12.73 | 12.07 |

In terms of the cutability rating (i.e., the cleanness of the cut), the Trial 1 boards were roughly equal to the control boards while the Trial 2 boards were near perfect under 70° F./50% RH conditioning and significantly improved under 90° F./90% RH conditioning. This is further illustrated in the cutability photographs included in FIGS. 19-24.

Figure 19:
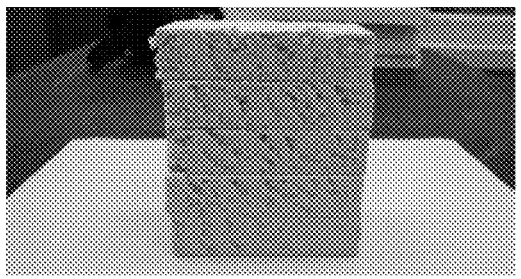
FIG. 19 shows a photograph of Control Board having Newsprint: 20.0%; Starch: 8.0% conditioned at 70° F./50% RH from Example 3.

FIG. 19 shows a photograph of Control Board having Newsprint: 20.0%; Starch: 8.0% conditioned at 70° F./50% RH from Example 3.

Figure 20:
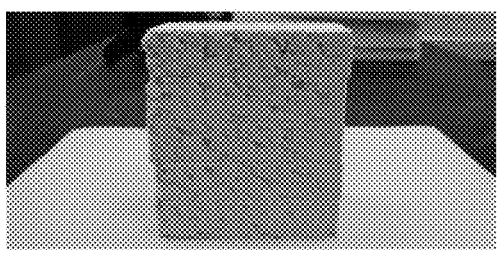
FIG. 20 shows a photograph of Trial Board 1 having Newsprint: 15.0%; Starch: 9.0% conditioned at 70° F./50% RH from Example 3.

FIG. 20 shows a photograph of Trial Board 1 having Newsprint: 15.0%; Starch: 9.0% conditioned at 70° F./50% RH from Example 3.

Figure 21:
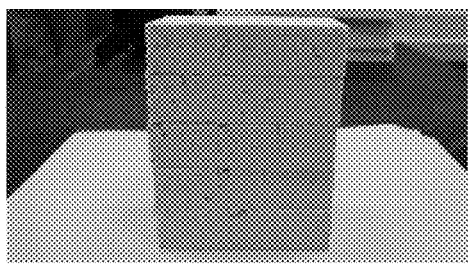
FIG. 21 shows a photograph of Trial Board 2 having Newsprint: 12.0%; Starch: 10.0% conditioned at 70° F./50% RH from Example 3.

FIG. 21 shows a photograph of Trial Board 2 having Newsprint: 12.0%; Starch: 10.0% conditioned at 70° F./50% RH from Example 3.

Figure 22:
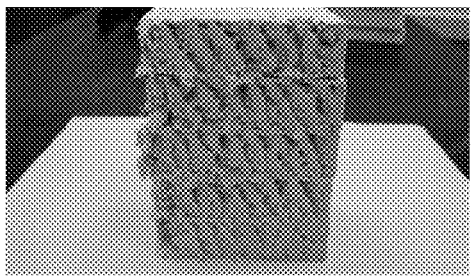
FIG. 22 shows a photograph of Control Board having Newsprint: 20.0%; Starch: 8.0% conditioned at 90° F./90% RH from Example 3.

FIG. 22 shows a photograph of Control Board having Newsprint: 20.0%; Starch: 8.0% conditioned at 90° F./90% RH from Example 3.

Figure 23:
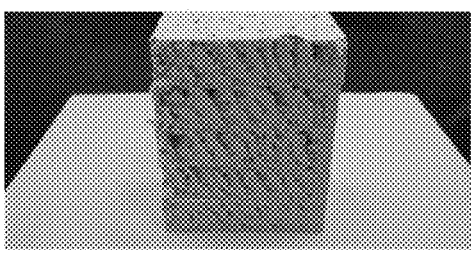
FIG. 23 shows a photograph of Trial Board 1 having Newsprint: 15.0%; Starch: 9.0% conditioned at 90° F./90% RH from Example 3.

FIG. 23 shows a photograph of Trial Board 1 having Newsprint: 15.0%; Starch: 9.0% conditioned at 90° F./90% RH from Example 3.

Figure 24:
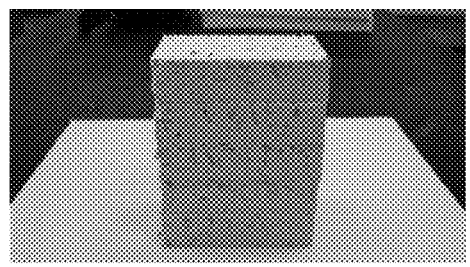
FIG. 24 shows a photograph of Trial Board 2 having Newsprint: 12.0%; Starch: 10.0% conditioned 90° F./90% RH at from Example 3.

FIG. 24 shows a photograph of Trial Board 2 having Newsprint: 12.0%; Starch: 10.0% conditioned at 90° F./90% RH from Example 3.

This data from a plant trial conducted on the second commercial size production line confirmed a higher starch/newsprint ratio contributed to significant improvements in cutability.

Example 4

The present Example details the results of trials conducted on both the first commercial size plant production line of Example 2 and the second commercial size plant production line of Example 3 in which the starch/newsprint ratio was varied to verify its effect on cutability.

Specific observations from the trials and subsequent testing include the following:

First commercial size plant production line: The flexural strength results for the first commercial size production line trial showed a lower flexural strength in the machine direction for the trial boards compared to the control boards (90.3 psi versus 97.0 psi, respectively). The flexural strength results in the cross-machine direction were statistically equivalent.

Second commercial size plant production line: The flexural strength results for the production line trial were statistically equivalent for the Control, Trial 1 and Trial 2 boards.

The stiffness results for the First commercial size plant production line trial boards exhibited significantly lower MOE values in both the machine and cross-machine directions compared to the control boards. The stiffness results for the second commercial size production line trials exhibited significantly higher MOE values in both the machine and cross-machine directions for both trials compared to the control boards.

The 2" ball hardness results for the first commercial size production line trial material exhibited significantly lower hardness values compared to the control values. This may in part be due to the lower density for these trial boards. The 2" ball hardness results for the second commercial size production line trial exhibited higher hardness values for both trials compared to the control boards. Boards from both trials on the second commercial size production line were slightly higher in density than the control boards.

TABLE 9 shows average composition and physical properties of the boards manufactured on the first commercial size production line. TABLE 10 shows average composition and physical properties of the boards manufactured on the second production line.

TABLE 9 shows First Commercial Size Plant Production Line Trial Board Physical Properties (CIC Values). In TABLE 9 the Control values were averages of measurements from four boards produced 15 minutes apart on the line. The Trial values were averages of measurements from four boards produced 15 minutes apart on the line.

TABLE 9

Averaged Results

| Trial No. | Newsprint (wt. %) | Starch (wt. %) | Starch/News Wt. Ratio | Thickness (inches) | Density (lbs./ft$^3$) | MOR | Corrected MOR | MOE | 2" Ball Hardness |
|---|---|---|---|---|---|---|---|---|---|
| All Control Boards | 20.0 | 8.0 | 0.40 | 0.563 | 14.75 | 88.1 | 90.9 | 16465 | 129.9 |
| All Trial Boards | 12.0 | 10.0 | 0.83 | 0.561 | 13.36 | 68.4 | 86.0 | 11688 | 115.9 |

TABLE 10 shows Second Commercial Size Plant Production Line Trial Board Physical Properties (CIC Values). In TABLE 10 the Control values were averages of measurements from four boards produced 15 minutes apart on the line. Trial 1 values were averages of measurements from three boards produced 15 minutes apart on the line. Trial 2 values were averages of measurements from four boards produced 15 minutes apart on the line.

TABLE 10

| Trial No. | News-print (wt. %) | Starch (wt. %) | Starch/ News Wt. Ratio | Thickness (inches) | Density (lbs/ft.3) | MOR | Corrected MOR | MOE | 2" Ball Hardness |
|---|---|---|---|---|---|---|---|---|---|
| All Control Boards | 20.0 | 8.0 | 0.40 | 0.557 | 14.09 | 89.1 | 89.2 | 17451 | 149.6 |
| All Trial 1 Boards | 15.0 | 9.0 | 0.60 | 0.556 | 14.66 | 95.8 | 88.7 | 18930 | 164.1 |
| All Trial 2 Boards | 12.0 | 10.0 | 0.83 | 0.556 | 14.30 | 93.4 | 90.9 | 19502 | 171.3 |

Cutability Test Results

The results of cutability testing are presented in the photographs of FIGS. 25-34 and summarized in TABLE 11 and TABLE 12. Each cutability value in TABLE 11 and TABLE 12 is the averages of 8 individual samples with each sample cut in the machine direction.

FIG. 25 shows a Cutability photograph of a First Commercial Size Plant Production Line Control Board having 20.0% News/8.0% Starch conditioned at 70° F./50% RH.

FIG. 26 shows a Cutability photograph of a First Commercial Size Plant Production Line Trial 1 Board having 12.0% News/10.0% Starch conditioned at 70° F./50% RH.

FIG. 27 shows a Cutability photograph of a First Commercial Size Plant Production Line Control Board having 20.0% News/8.0% Starch conditioned at 90° F./90% RH.

FIG. 28 shows a Cutability photograph of a First Commercial Size Plant Production Line Trial 1 Board having 12.0% News/10.0% Starch conditioned at 90° F./90% RH.

TABLE 11 summarizes First Plant Production Line Board Cutability Test Results. In TABLE 11 control values are averages of measurements from four boards produced 15 minutes apart on the line. Trial values are averages of measurements from four boards produced 15 minutes apart on the line. Each cutability value is the average of 8 individual samples from each board with each sample cut in the machine direction. To do the cutting the tests employed an INSTRON Test Machine with custom cutting jig employing the STANLEY cutting knife blade mentioned above.

TABLE 11

Summary of Cutability Test Results

| Sample | Time after start of test (minutes) | LOI (%) | Cutability Rating 70° F./ 50% RH | Cutability Rating 90° F./ 90% RH | Cutability Force 70° F./ 50% RH | Cutability Force 90° F./ 90% RH |
|---|---|---|---|---|---|---|
| Control | 0 | 22.6 | 2.88 | 4.36 | 21.4 | 24.6 |
| Control | 15 | 22.7 | 2.60 | 3.94 | 21.3 | 24.7 |
| Control | 30 | 23.3 | 2.71 | 4.15 | 21.5 | 25.0 |
| Control | 45 | 22.0 | 2.85 | 4.06 | 22.8 | 25.2 |
| Average of Control Samples | | 22.6 | 2.76 | 4.13 | 21.7 | 24.9 |
| Trial 1 | 0 | 20.7 | 1.42 | 2.53 | 14.1 | 15.9 |
| Trial 1 | 15 | 21.0 | 1.50 | 2.45 | 14.6 | 16.7 |
| Trial 1 | 30 | 20.6 | 1.54 | 2.35 | 13.7 | 15.8 |
| Trial 1 | 45 | 21.5 | 1.76 | 2.74 | 16.0 | 18.8 |
| Average of Trial 1 Samples | | 20.9 | 1.55 | 2.52 | 14.6 | 16.8 |

FIG. 29 shows a Cutability photograph of a Second Commercial Size Plant Production Line Control Board made with 20.0% Newsprint/8.0% Starch conditioned at 70° F./50% RH.

FIG. 30 shows a Cutability photograph of a Second Commercial Size Plant Production Line Trial 1 Board made with 15.0% Newsprint/9.0% Starch conditioned at 70° F./50% RH.

FIG. 31 shows a Cutability photograph of a Second Commercial Size Plant Production Line Trial 2 Board made with 12.0% Newsprint/10.0% Starch conditioned at 70° F./50% RH.

FIG. 32 shows a Cutability photograph of a Second Commercial Size Plant Production Line Control Board made with 20.0% Newsprint/8.0% Starch conditioned at 90° F./90% RH.

FIG. 33 shows a Cutability photograph of a Second Commercial Size Plant Production Line Trial 1 Board made with 15.0% Newsprint/9.0% Starch conditioned at 90° F./90% RH.

FIG. 34 shows a Cutability photograph of a Second Commercial Size Plant Production Line Trial 2 Board made with 12.0% Newsprint/10.0% Starch conditioned at 90° F./90% RH.

TABLE 12 summarizes Second Commercial Size Plant Production Line Trial Board Cutability Test Results. In TABLE 12, control values are averages of measurements from four boards produced 15 minutes apart on the line. Trial 1 values are averages of measurements from three boards produced 15 minutes apart on the line. Trial 2 values are averages of measurements from four boards produced 15 minutes apart on the line. Each cutability value is the average of 8 individual samples from each board with each sample cut in the machine direction.

The tests cut using an INSTRON Test Machine with custom cutting jig employing the STANLEY cutting knife blade mentioned above.

TABLE 12

Summary of Cutability Test Results

| Sample | Time after start of test (minutes) | LOI (%) | Cutability Rating | | Cutability Force | |
|---|---|---|---|---|---|---|
| | | | 70° F./ 50% RH | 90° F./ 90% RH | 70° F./ 50% RH | 90° F./ 90% RH |
| Control | 0 | 22.2 | 2.13 | 3.21 | 19.3 | 20.7 |
| Control | 15 | 22.4 | 2.00 | 2.95 | 18.1 | 19.0 |
| Control | 30 | 22.0 | 1.61 | 3.34 | 18.3 | 22.1 |
| Control | 45 | 21.9 | 1.78 | 3.17 | 18.1 | 20.6 |
| Average of Control Samples | | 22.1 | 1.88 | 3.17 | 18.5 | 20.6 |
| Trial 1 | 0 | 22.5 | 1.63 | 3.64 | 18.6 | 23.1 |
| Trial 1 | 15 | 22.5 | 1.57 | 4.19 | 17.8 | 21.8 |
| Trial 1 | 30 | 23.0 | 1.58 | 3.80 | 17.8 | 22.1 |
| Average of Trial 1 Samples | | 22.7 | 1.59 | 3.87 | 18.0 | 22.3 |
| Trial 2 | 0 | 20.9 | 1.19 | 2.62 | 17.2 | 18.2 |
| Trial 2 | 15 | 20.7 | 1.12 | 2.79 | 16.6 | 18.1 |
| Trial 2 | 30 | 20.1 | 1.09 | 2.01 | 16.5 | 17.4 |
| Trial 2 | 45 | 20.2 | 1.09 | 2.05 | 15.7 | 16.4 |
| Average of Trial 2 Samples | | 20.5 | 1.12 | 2.37 | 16.5 | 17.5 |

Overall there was a significant improvement in the cutability rating when comparing the control product produced using 8% starch and 20% newsprint to the improved cutability formula produced using 10% starch and 12% newsprint.

The Second Line data showed the Trial 2 formula with targets of 10% starch and 12% newsprint was a good candidate formula yielding equal or improved physicals and significantly improved cutability under both ambient and high humidity conditions.

It should be evident this disclosure is by way of example and various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. An acoustical tile comprising:
    15.0 to 20.0 wt % mineral wool,
    9.5 to 10.5 wt % starch binder,
    12.0 to 14.0 wt % cellulosic fiber, wherein said cellulosic fiber is newsprint, and
    55.0 to 65.0 wt % perlite,
    wherein the acoustical tile has: an absence of glass beads, an absence of clay, an absence of vermiculite, an absence of gypsum, an absence of calcium carbonate, an absence of magnesium carbonate, and an absence of Zinc pyrithione, and
    wherein a weight ratio of the starch to the cellulosic fiber is 0.7-0.9:1.0.

2. The acoustical tile of claim 1, wherein the acoustical tile comprises:
    16.0 to 18.5 wt % mineral wool,
    9.5 to 10.5 wt % starch binder
    12.0 to 13.0 wt % cellulosic fiber, wherein said cellulosic fiber is newsprint, and
    57.0 to 62.0 wt % perlite;
    wherein the starch:cellulosic fiber weight ratio is 0.75 to 0.9:1.0.

3. The acoustical tile of claim 1, wherein 0% of the cellulosic fiber is provided by paper sludge obtained from pulp and paper processing waste.

4. The acoustical tile of claim 1, wherein the acoustical tile has: an absence of inorganic material other than perlite and mineral wool, and 0% of the cellulosic fiber is provided by paper sludge obtained from pulp and paper processing waste.

5. The acoustical tile of claim 1, wherein the acoustical tile has an average cutability rating of 1 to 2 after 3-day conditioning at 70° F. and 50% relative humidity.

6. The acoustical tile of claim 1, wherein the acoustical tile has an average cutability rating of 1 to 2 after 3-day conditioning at 90° F. and 90% relative humidity.

7. The acoustical tile of claim 1, wherein the acoustical tile is about ⅜ inches to about 1 inch thick.

8. The acoustical tile of claim 1, wherein the acoustical tile is about % inches to about ⅞ inches thick.

9. The acoustical tile of claim 1, wherein the acoustical tile has an average cutability rating of 1 to 2 after 3-day conditioning at 70° F. and 50% relative humidity.

10. The acoustical tile of claim 1, wherein the acoustical tile has an average cutability rating of 1 to 2 after 3-day conditioning at 90° F. and 90% relative humidity.

11. The acoustical tile of claim 1, wherein a density of the acoustical tiles is about 10 to 17 pounds per cubic foot.

12. A process for manufacturing acoustical tile of claim 1 in a water-felting process, comprising: mixing an aqueous slurry comprising water and, ingredients comprising on a water free-basis:
    15.0 to 20.0 wt % mineral wool,
    9.5 to 10.5 wt % starch binder,
    12.0 to 14.0 wt % cellulosic fiber, and
    55.0 to 65.0 wt % perlite,
    wherein a weight ratio of the starch to the cellulosic fiber is 0.7-0.9:1.0, and
    wherein said cellulosic fiber is newsprint;
    continuously flowing the slurry onto a moving foraminous support wire to form a cake;
    dewatering the cake to form a base mat such that the cake has a drain time of less than 20 seconds; and drying the base mat to produce the acoustical tile,
    wherein the acoustical tile has: an absence of glass beads, an absence of clay, an absence of vermiculite, an absence of gypsum, an absence of calcium carbonate, an absence of magnesium carbonate, and an absence of Zinc pyrithione.

13. The process of claim 12, wherein 0% of the cellulosic fiber is provided by paper sludge obtained from pulp and paper processing waste.

14. The process of claim 12, wherein the acoustical tile has an absence of inorganic material other than perlite and mineral wool, and 0% of the cellulosic fiber is provided by paper sludge obtained from pulp and paper processing waste.

15. The process of claim 12, wherein the acoustical tile is about ⅜ inches to about 1 inch thick.

16. The process of claim 12, wherein the acoustical tile is about ⅝ inches to about ⅞ inches thick.

17. The process of claim 12, wherein the acoustical tile comprises:
16.0 to 18.5 wt % mineral wool,
9.5 to 10.5 wt % starch binder
12.0 to 13.0 wt % cellulosic fiber, wherein said cellulosic fiber is newsprint, and
57.0 to 62.0 wt % perlite;
wherein the starch:cellulosic fiber weight ratio is 0.75 to 0.9:1.0.

18. The process of claim 12, wherein the acoustical tile has an average cutability rating of 1 to 2 after 3-day conditioning at 70° F. and 50% relative humidity.

19. The process of claim 12, wherein the acoustical tile has an average cutability rating of 1 to 2 after 3-day conditioning at 90° F. and 90% relative humidity.

\* \* \* \* \*

UNITED STATES PATENT AND TRADEMARK OFFICE
CERTIFICATE OF CORRECTION

PATENT NO. : 9,896,807 B2
APPLICATION NO. : 14/866055
DATED : February 20, 2018
INVENTOR(S) : Mark H. Englert and William A. Frank It is certified that error appears in the above-identified patent and that said Letters Patent is hereby corrected as shown below:

In the Claims

Claim 8, Column 22, Line 27 should read: "tile is about ⅝ inches to about ⅞ inches thick."

Claim 16, Column 23, Line 2 should read: "about ⅝ inches to about ⅞ inches thick."

Signed and Sealed this
First Day of May, 2018

Andrei Iancu
*Director of the United States Patent and Trademark Office*